(12) United States Patent
Wang

(10) Patent No.: US 11,934,963 B2
(45) Date of Patent: Mar. 19, 2024

(54) INFORMATION PROCESSING METHOD, NON-TRANSITORY STORAGE MEDIUM AND INFORMATION PROCESSING DEVICE

(71) Applicant: KABUSHIKI KAISHA TOSHIBA, Tokyo (JP)

(72) Inventor: Lan Wang, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1068 days.

(21) Appl. No.: 16/297,828

(22) Filed: Mar. 11, 2019

(65) Prior Publication Data

US 2019/0347561 A1    Nov. 14, 2019

(30) Foreign Application Priority Data

May 11, 2018  (JP) .................................. 2018-092431

(51) Int. Cl.
*G06N 5/04*     (2023.01)
*G06N 20/00*    (2019.01)

(52) U.S. Cl.
CPC ............... *G06N 5/04* (2013.01); *G06N 20/00* (2019.01)

(58) Field of Classification Search
None
See application file for complete search history.

(56) References Cited

U.S. PATENT DOCUMENTS

| | | | |
|---|---|---|---|
| 9,270,518 B2 | 2/2016 | Muro et al. | |
| 2012/0101975 A1 | 4/2012 | Khosravy | |
| 2012/0203759 A1 | 8/2012 | Kim et al. | |
| 2012/0254085 A1 | 10/2012 | Maruyama et al. | |
| 2015/0347467 A1 | 12/2015 | Basson et al. | |
| 2016/0224645 A1 | 8/2016 | Dang | |
| 2016/0335544 A1 | 11/2016 | Bretschneider et al. | |

(Continued)

FOREIGN PATENT DOCUMENTS

| EP | 2 618 444 A1 | 7/2013 |
|---|---|---|
| JP | 2014-509004 A | 4/2014 |
| WO | WO 2011/145374 A1 | 11/2011 |

(Continued)

OTHER PUBLICATIONS

Bonasso, et al., Ontological Models To Support Planning Operations, Internation Workshop on Planning and Scheduling in Space (IWPSS 13), 2013, pp. 1-9 (Year: 2013).*

(Continued)

*Primary Examiner* — Wilbert L Starks
(74) *Attorney, Agent, or Firm* — Finnegan, Henderson, Farabow, Garrett & Dunner, LLP

(57) ABSTRACT

According to one embodiment, an information processing method classifies an instance including a combination of data items of subclasses of either physical world classes describing physical entities or cyber world classes describing concepts. The information processing method comprises the steps of: obtaining first data including the instance; and inferring and determining a subclass the instance belongs to by referring to at least either definition data or log data. The definition data defines the subclasses. The log data includes a set of the first data obtained in the past, each of the first data including the instance with the corresponding subclass defined in the definition data.

21 Claims, 19 Drawing Sheets

EXAMPLE OF METAMODEL DEFING RELATION BETWEEN CLASSES (DRMM)

(56) References Cited

U.S. PATENT DOCUMENTS

2017/0046425 A1   2/2017  Tonkin et al.

FOREIGN PATENT DOCUMENTS

WO   WO 2013/137903 A1   9/2013
WO   WO 2016/145480 A1   9/2016

OTHER PUBLICATIONS

Nayak, et al., XML Schema Clustering with Semantic and Hierarchical Similarity Measures, Knowledge-Based Systems 20, 2007, pp. 336-349 (Year: 2007).*
Bonasso, et al., Ontological Models To Support Planning Operations, International Workshop on Planning and Scheduling in Space (IWPSS 13), 2013, pp. 1-9 (Year: 2013).*
Atkinson, et al., Using Sequence Similarity Networks for Visualization of Relationships Across Diverse Protein Superfamilies, PLoS One 4(2): e4345, 2009, pp. 1-14 (Year: 2009).*

* cited by examiner

TERMINOLOGY OF DATA STUCTURES

PW CLASS
├── SUBCLASS#1
CW CLASS              ⎫
                       ⎬ RELATION  ← METAMODEL
├── SUBCLASS#2        ⎭

HEIRARCHICAL CLASSIFICATION OF CLASSES AND CODES → (PW_E, G, GT, CW_S, C)  ← ONTOLOGY

FORMAL DESCRIPTION → { +B001, +B002, =B001 }

SCHEMA → { {CODE, RATED EFFICIENCY, TYPE, RUNNING TIME}, {CODE, TYPE, VALUE} }

VALUES ARE STORED IN EACH ITEM ACCORDING TO DEFINITION

INSTANCE (ACTUAL DATA) → { {B001, TEMP. SENSOR, 100°C}, {B002, FLOW SENSOR, 300L/min}, ⋮ }

FIG. 3

STRUCTURE OF FIRST DATA
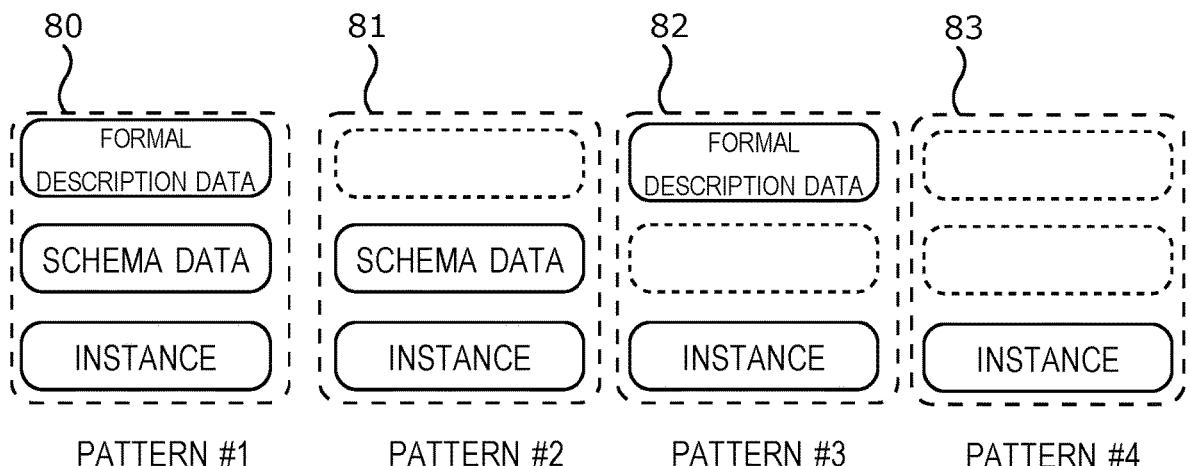
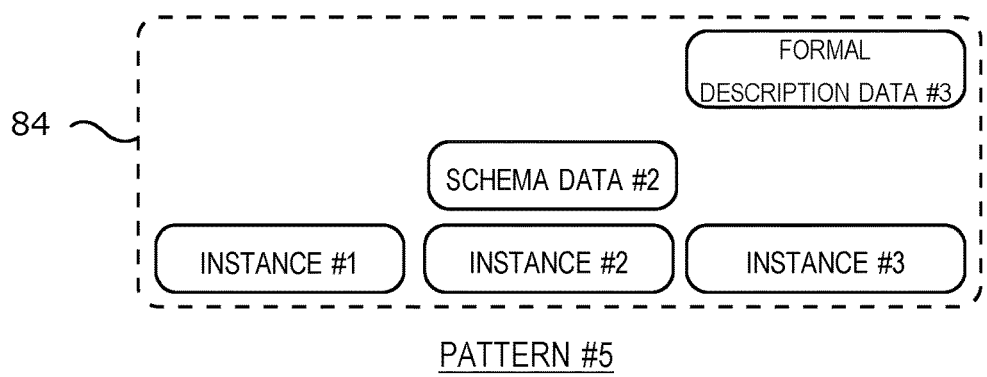
FIG. 6

SET OF DATA GENERATED BY REMOVING LETTERS AND SYMBOLS FROM INSTANCES IN THE LOG DB:

$L' = [a'_1, a'_2, a'_3, ..., a'_m]$ where $a'_i = \{g'_1, g'_2, g'_3, g'_4\}$

SET OF DATA GENERATED BY REMOVING LETTERS AND SYMBOLS FROM FIRST DATA:

$N' = [b'_1, b'_2, b'_3, ..., b'_n]$ where $b'_k = \{h'_1, h'_2, h'_3, h'_4\}$
(SOME $b'_j$ MAY BE DUPLICATES)

START

S501 — BY REMOVING LETTERS AND SYMBOLS FROM EACH INSTANCE STORED IN LOG DB, PREPARE A SET OF DATA $L'$ ONLY WITH NUMERICAL DATA

S502 — BY REMOVING LETTERS AND SYMBOLS FROM EACH INSTANCE IN THE FIRST DATA, PREPARE A SET OF DATA $N'$ ONLY WITH NUMERICAL DATA

S503 — CALCULATE SIMILARITY OF EACH DATA $a'_i$ INCLUDED IN SET $L'$ AND EACH DATA INCLUDED IN SET $N'$ BY MACHINE LEARNING METHODS

S504 — TYPE OF DATA WITH HIGHEST SIMILARITY IN DATA $a'_i$ OF SET $L'$ IS TYPE OF DATA (SUBCLASS) OF EACH DATA $b'_k$ IN SET $N'$

END

FIG. 15

CALCULATION OF SIMILARITY BY MACHINE LEARNING METHODS (SECOND METHOD)

EXAMPLE OF DATA $a'_i$ GENERATED FROM LOG DB (SYMBOLS AND LETTERS REMOVED)

B001 100 100 300 400 500 ← 66

B002 200 300 340 500 600 ← 67

EXAMPLE OF DATA $b'_k$ GENERATED FROM FIRST DATA (SYMBOLS AND LETTERS REMOVED)

C002 230 350 400 450 700 ← 68

CALCULATE SIMILARITY

EXAMPLE OF CALCULATION METHODS:

○ CLUSTERING
(FOR EXAMPLE, HIERARCHICAL CLUSTERING)

○ EUCLID DISTANCE, WARD METHOD

THE INSTANCE WITH IDENTIFIER "C002" IS MOST SIMILAR TO THE INSTANCE WITH IDENTIFIER "B002"

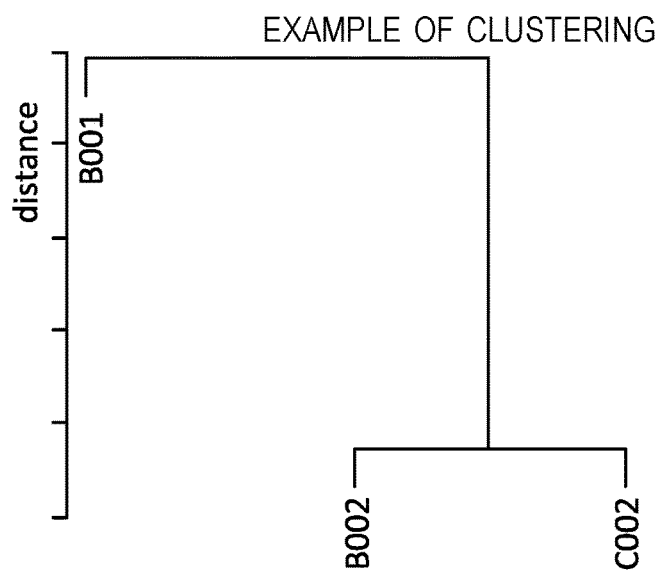

EXAMPLE OF CLUSTERING

FIG. 16

INFERRED AND DETERMINED CLASSIFICATION OF OBTAINED DATA

COMBUSTION GAS TEMPERATURE IN THE INLET OF A     1325K
SECOND GAS TURBINE:

CLASS/SCHEMA:     GAS TURBINE/TEMPERATURE

SUBCLASS:

PHYSICAL WORLD→POWER GENERATOR→THERMAL POWER GENERATOR→TURBINE→GAS TURBINE→SENSOR→TEMP. SENSOR

RELATED SUBCLASSES:

CYBER WORLD CLASS→...→ROTATION SPEED CONFIGURATION

CYBER WORLD CLASS→...→EXHAUST GAS TEMP. CONFIGURATION

EVALUATED SIMILARITY WAS GREATER THAN THRESHOLD ( EDIT RESULT )   ( SAVE RESULT )

INFORMATION PROCESSING METHOD, NON-TRANSITORY STORAGE MEDIUM AND INFORMATION PROCESSING DEVICE

CROSS-REFERENCE TO RELATED APPLICATIONS

This application is based upon and claims the benefit of priority from Japanese Patent Application No. 2018-092431, filed on May 11, 2018; the entire contents of which are hereby incorporated by reference.

FIELD

Embodiments described herein relate generally to an information processing method, a non-transitory storage medium and an information processing device.

BACKGROUND

In IoT and Industrie4.0, various devices and systems are interconnected together to form a network where any type of data can be exchanged. In such networks, numerous sensors and a plurality of systems for different processes are interconnected.

Data collected from different sources need to be utilized effectively to accelerate the automation of facilities including various infrastructures, factories and plants. Thereby, goals including reduction of costs, improvement of safety and higher qualities of manufactured goods are achieved. In order to achieve the above goals, data need to be classified correctly, clarifying the types of data and the relations which exist between the different data.

Methods for processing data obtained from different sources include methods which use ontology and various machine learning methods. The ontology defines the specification of data. When these methods are used, the types of data are inferred and determined based on common characteristics. However, in the above methods, the fact that relations between the data actually depends on the type of data is not taken into account. It is necessary to infer and determine the type of data even for cases when the corresponding type of data is not defined. Also, it is necessary to infer and determine the relations between the data.

BRIEF DESCRIPTION OF THE DRAWINGS

FIG. 3 is a diagram representing the terminology of data structures;

FIG. 6 is a diagram representing the structure of collected first data;

FIG. 15 is a flowchart describing the second method for determining the type of data for instances based on the similarity of instances;

FIG. 16 is a diagram describing the second method for calculating the similarity based on values of instances;

FIG. 17 is a diagram illustrating an example of a screen for displaying the results of classification of the first data;

DETAILED DESCRIPTION

According to one embodiment, an information processing method classifies an instance including a combination of data items of subclasses of either physical world classes describing physical entities or cyber world classes describing concepts. The information processing method comprises the steps of: obtaining first data including the instance; and inferring and determining a subclass the instance belongs to by referring to at least either definition data or log data. The definition data defines the subclasses. The log data includes a set of the first data obtained in the past, each of the first data including the instance the corresponding subclass is defined in the definition data.

Hereinafter, embodiments of the present invention will be described in reference to the drawings.

First Embodiment

Data collected from systems including numerous sensors and different processes can be classified into either physical world data or cyber world Data. Here, physical world data is data describing physical entities. Cyber world data is data describing concepts. The relation between data is different between the physical world data and the cyber world data. If the physical world data and the cyber world data are classified ensuring that information on relations between data could be obtained, it is possible to clarify the characteristics of data obtained from various sources. Also, information on the relation of data obtained from various sources can be obtained. If data is classified by the information processing device according to the embodiment, it is possible to obtain information on different characteristics of data obtained from various sources and the relation of data. Therefore, utilization of data obtained from multiple systems becomes easier.

In the following, the configuration of a system including the information processing device according to the embodiment is described.

Figure 1:
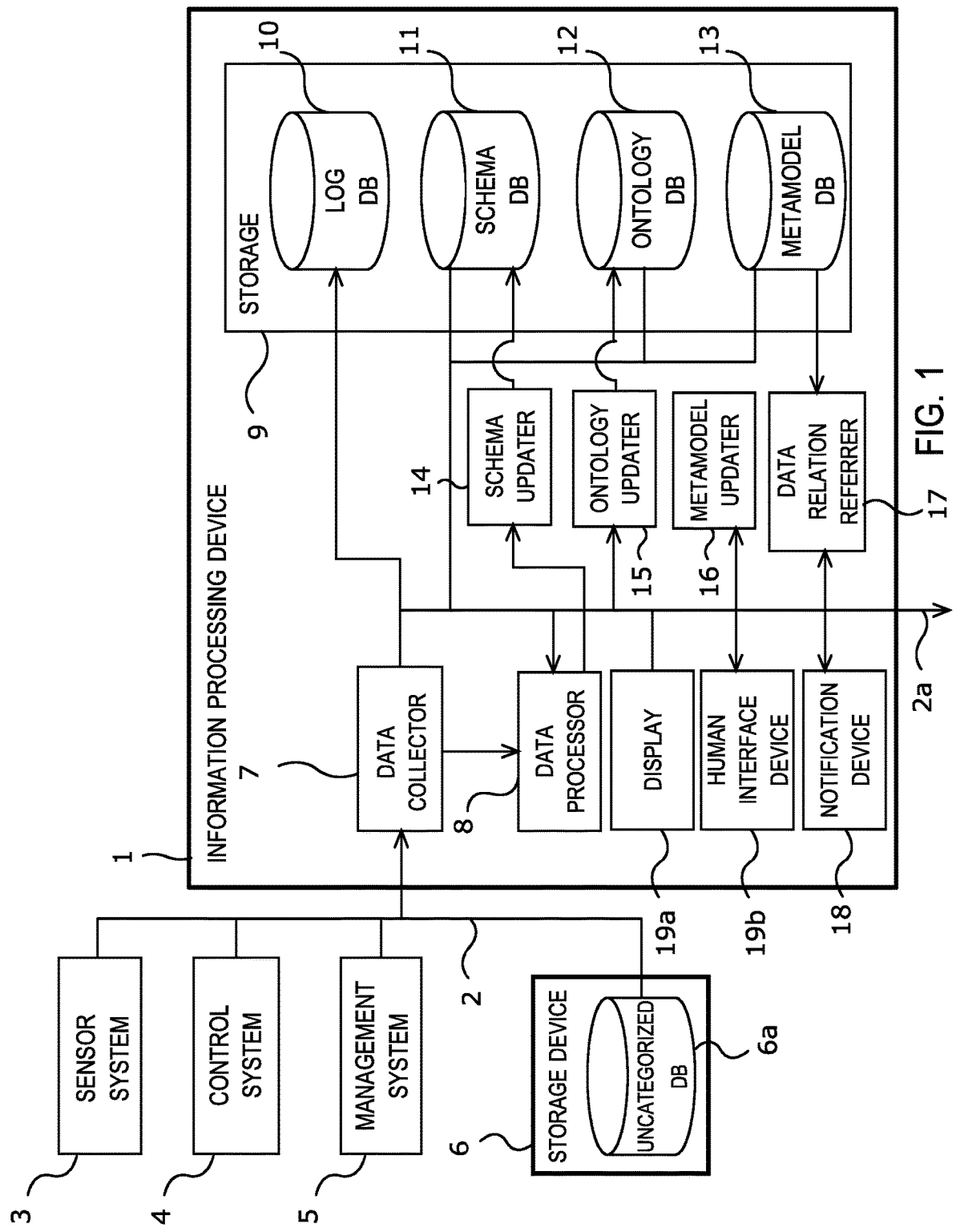
FIG. 1 is a block diagram presenting an example of an information processing system in accordance with a first embodiment.

FIG. 1 is a block diagram of an information processing system in accordance with a first embodiment. An information processing system according to a first embodiment will be described in reference to FIG. 1.

The system of FIG. 1 includes an information processing device 1, a network 2, a network 2a, a sensor system 3, a control system 4, a management system 5 and a storage device 6. The information processing device 1, the sensor system 3, the control system 4, the management system 5 and the storage device 6 are connected together via the network 2.

The information processing device 1 infers and determines the type of data for the data obtained from different sources. The data obtained by the information processing device 1 is called the first data. The process of determining the type of data is referred to as the classification of data. Here, the actual data is data excluding the metadata within the first data. Then, the information processing device 1 provides information on the data type and the relations between classes for the actual data. In some cases, the first data includes actual data of types which are defined in the definition data. In some cases, the first data includes actual data of types which are not defined in the definition data. Also, the actual data of the former case and the actual data of the later case may coexist in the first data.

When the information processing device 1 detects data belonging to a class which is not defined yet, the information processing device 1 adds the definitions of; the new class, the schema corresponding to the new class and the type of data corresponding to the new class, to the definition data. Also, the ontology and the class corresponding to the metamodel are added to the definition data. The information processing device 1 may notify the type of data for the collected actual data, the class corresponding to the type of data and the information on the relation between the classes to the users or external information processing devices.

Each class may be associated to the type of data and the schema. As mentioned later, a plurality of classes may be defined using hierarchical structures. In other words, the hierarchical structure of classes describes a set of schemas. The actual data is described by using schemas which define the format of each class. The classes are classified into either the physical world (PW) class or the cyber world (CW) class. In the PW class, classes are defined based on physical entities. In the CW class, classes are defined conceptually. The classes corresponding to the type of data will be the subclass of either the PW class or the CW class. Therefore, the actual data (each of the instances) are classified as the subclasses of either the PW class or the CW class. In order to describe the abstract relationships between the subclasses, it is possible to define relations between the subclasses. The relations may indicate physical connections such as inheritance relations (is-a), inclusion relations (has-a) or reference relations. Also, the relations may indicate conceptual associations.

Examples of data defined in the physical world (PW) include the types of devices, the installed location, the number of devices, the mechanical connections of devices, the electrical connections of devices, relative positions of the devices and the locations of switches. Examples of data defined in the cyber world include the performance indicator of devices, energy conversion efficiencies of power generators, energy conversion efficiencies of lighting equipment, the operation principle of the device (for example, incandescent light bulbs or LEDs for lighting equipment), the life period of the device, inheritance between concepts, causal relationships between events and the configuration information of user accounts in information systems. Data defined in the cyber world (CW) include items without physical entities. Examples of such items include user accounts, files, groups, allocation of computing resources, allocation of storage space, access settings, scores of users, status information in virtual reality (VR) environments, points owned by users and virtual currency owned by the users.

By considering the relation between classes and the differences between the PW class and the CW class, the operation of facilities including infrastructures, factories and plants can be executed uniformly. Examples of operations include launch, halt, control, manufacture, diagnosis, maintenance, shipments, packaging, analysis of data, configuration changes and changes of operation modes. However, any type of operation can be executed.

Figure 2:
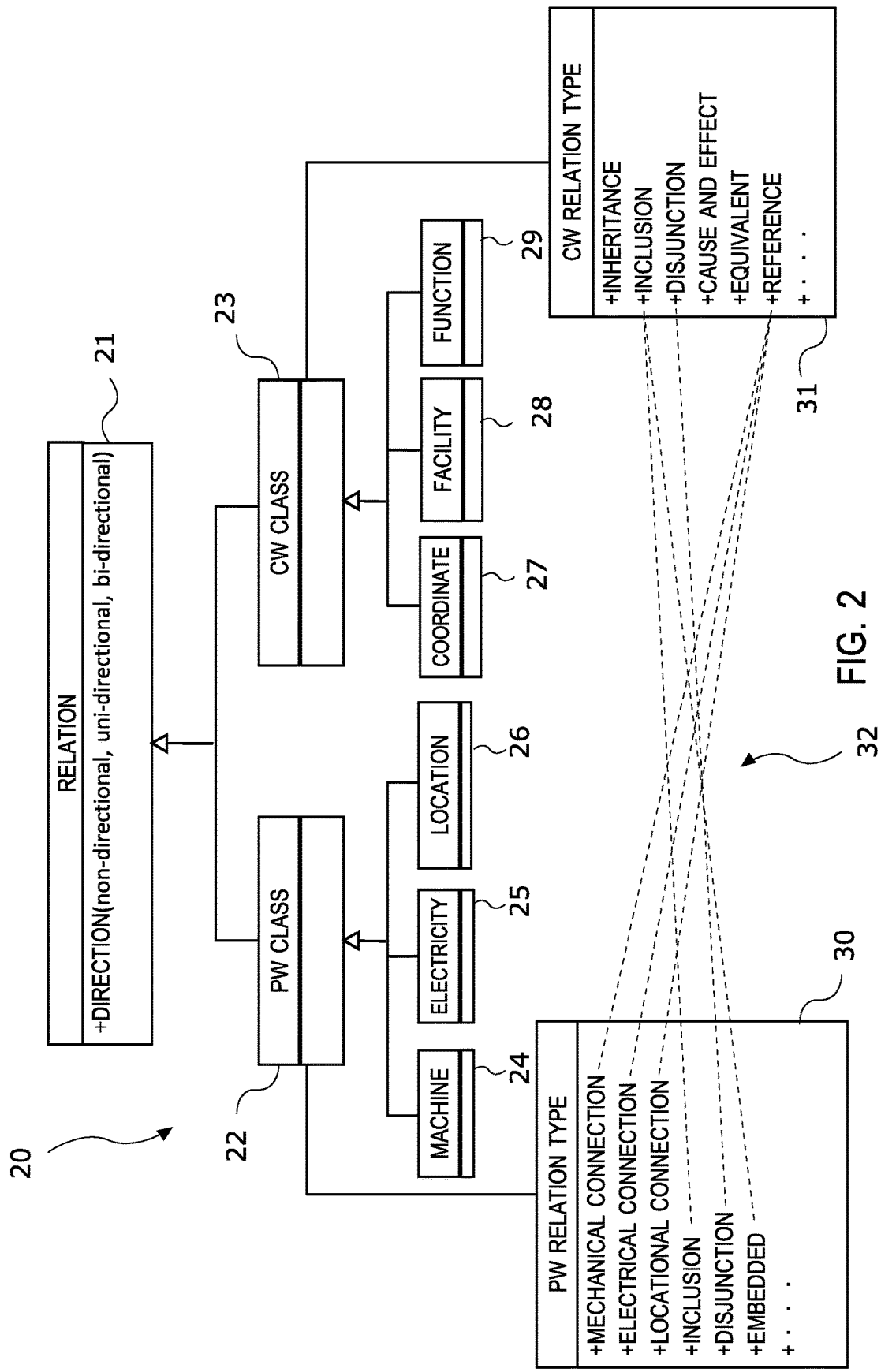
FIG. 2 is a diagram representing an example of a meta-model.

FIG. 2 is a diagram representing an example of a metamodel used by the information processing method and the information processing device according to the first embodiment. FIG. 2 illustrates a metamodel 20 which defines the classification (PW class or CW class) of classes and the relations between the data. The metamodel 20 is a Data Relationship Meta-Model (DRMM). Referring to the metamodel 20, it is possible to confirm that each class belongs to either the PW class (class 22) or the CW class (class 23). A plurality of subclasses is defined for both the PW class and the CW class (classes 24-29). Each of the subclasses can be associated to either of the schemas and types of data.

In the example of FIG. 2, a machine class (class 24), an electricity class (class 25), a location class (class 26) and a PW relation type class (class 30) are defined as subclasses of the PW class. The PW relation type class defines the relation between the classes. Examples of relations defined by the PW relation type class include mechanical connections, electrical connections, locational connections, inclusions, disjunctions, embedded, raw materials and prevention. For example, if a "device class" and a "sensor device class" are defined as subclasses of the PW class, the "sensor device class" has an "inclusion" relation with respect to the "device class".

In the example of FIG. 2, a coordinate class (class 27), a facility class (class 28), a function class (class 29) and a CW relation type class (class 31) are defined as subclasses of the CW class. Similar to the PW relation type class, the CW relation type class defines the relation between the classes. Examples of relations defined by the CW relation type class include inheritance, inclusion, disjunction, cause and effect, equivalent and reference. For example, if a "system class" and a "supplementary power system class" are defined as subclasses of the CW class, the "supplementary power system class" has an "inheritance" relation with respect to the "system class".

Also, a conversion rule 32 is defined between the PW relation type class and the CW relation type class. The relations defined in the PW relation type class and the relations defined in the CW relation type class may be convertible if they have certain associations. For example, the "mechanical connection" in the PW relation type class corresponds to the "reference" in the CW relation type class. Thus, the two relations can be converted to each other. Not all the relations defined in the PW relation type class need to have a conversion rule. Also, a relation defined in the PW relation type class may have a plurality of a conversion rules. The above conditions also apply for the relations defined in the CW relation type class.

The subclasses of the PW class, the subclasses of the CW class, the relations and conversion rules described above are presented as examples. Therefore, in the information processing device (information processing method) according to the embodiment, different subclasses, relations and conversion rules can be defined. As mentioned above, the definition data defines the subclasses for each type of data. In the following, if simply a "class" is referred, it stands for a subclass of the PW class or the CW class. Thus, a "class" refers generally to the definition of data associated to the type of data.

Below, the system according to the first embodiment is described in reference to FIG. 1.

The network 2 enables communication of data between the information processing device 1, the sensor system 3, the control system 4, the management system 5 and the storage device 6. On the other hand, the network 2a enables communication of data between external information processing devices and the information processing device 1. External information processing devices may receive data including the type of data for the collected actual data, classes and relations via the network 2a. Also, the external information processing device may refer to the definition data saved in the storage 9 of the information processing device 1.

It is possible to use various communication media including optical fibers, LAN cables, telephone lines, coaxial cables, wireless and combination of the above for the networks 2 and 2a. Also, it is possible to use various communication standards including the Ethernet, wireless LAN (IEEE802.11 series), NFC, Bluetooth, ZigBee and LPWA (Low-Power Wide-Area). However, the types of communication standards used in the networks 2 and 2a are not limited.

The networks 2 and 2a may be independent networks as illustrated in the example of FIG. 1. The networks 2 and 2a may be connected together, forming a single network.

The sensor system 3 is a system which measures physical information by using a plurality of sensors. The sensor system 3 may be a wireless sensor network. Also, the sensor system 3 may be a set of sensors installed in facilities including various infrastructure, factories and plants. The types of sensors and the number of sensors in the sensor system 3 are not limited. The information processing device 1 receives data including the physical information measured by the sensors, from the sensor system 3.

The control system 4 is a system which controls facilities including various infrastructure, factories and plants. Any type of device may be controlled by the control system 4. The information processing device 1 may obtain data including the configured values of devices, the operation modes of devices and the conditions of devices, from the control system 4.

The management system 5 is an information system which executes various operations including the configuration of user accounts, configuration of access authority, logging of executed operations, allocation of computing resources to the users and monitoring usage of computing resources. The information processing device 1 may obtain data including operation activities of users following logins, operation histories and usage of computing resources, from the management system 5.

The storage device 6 is a storage system which provides storage space for saving the collected first data. The data stored in the storage device 6 may be data collected from the sensor system 3, the control system 4, the management system 5 or any other system. If the total amount of first data is large, the first data can be stored temporary in the storage device 6. Then, the information device 1 can classify the data stored in the storage device 6.

Next, internal components of the information processing device 1 are described.

The information processing device 1 includes a data collector 7, a data processor 8, a storage 9, a schema updater 14, an ontology updater 15, a metamodel updater 16, a data relation referrer 17, a notification device 18, a display 19a and a human interface device 19b.

The data collector 7 accesses the network 2 to collect data from the sensor system 3, the control system 4, the management system 5 and the storage device 6. The data collector 7 saves the collected data to the log database 10. The data collected by the data collector is the first data. The data collector 7 also transfers the first data to the data processor 8. Details of the first data are described later.

The data processor 8 provides information of the classification and various attributes of the actual data. Namely, the data processor 8 infers and determines the schema, the type of data corresponding to the schema, the class corresponding to the type of data, for the actual data (instance) included in the first data. The data processor 8 executes the above process by referring to the definition data saved in the storage 9. If the data processor 8 finds that specific types of data, schemas and subclasses are not defined in the definition data, the data processor 8 instructs the schema updater 14, the ontology updater 15 or the metamodel updater 16 to update the definition data in the storage 9. Details of the processes executed by the data processor 8 are described later.

The data collector 7 and data processor 8 may be implemented by hardware circuitry such as processors (CPUs), ASICs and CPLDs. The data collector 7 and data processor 8 may be also implemented by programs such as the operating systems and applications, or the combination of the above.

The storage 9 is a storage which provides storage space for saving various data including the collected first data, the definition data, the log data and programs. Examples of storage 9 include volatile memory such as SRAM and DRAM. The storage 9 may be nonvolatile memory such as NAND flash memory, MRAM or FRAM. Also, the storage 9 may be HDDs, SSDs or external storage devices. However, the type of device used as the storage 9 is not limited. For example, the storage 9 can be a combination of different memories and storage devices.

A log database (log DB) 10, a schema database (schema DB) 11, an ontology database (ontology DB) 12 and a metamodel database (metamodel DB) 13 are saved in the storage 9. The roles of each database in the storage 9 are explained later. In the following, the data structures used in the information processing method and the information processing device according to the embodiment are described.

Figure 4:
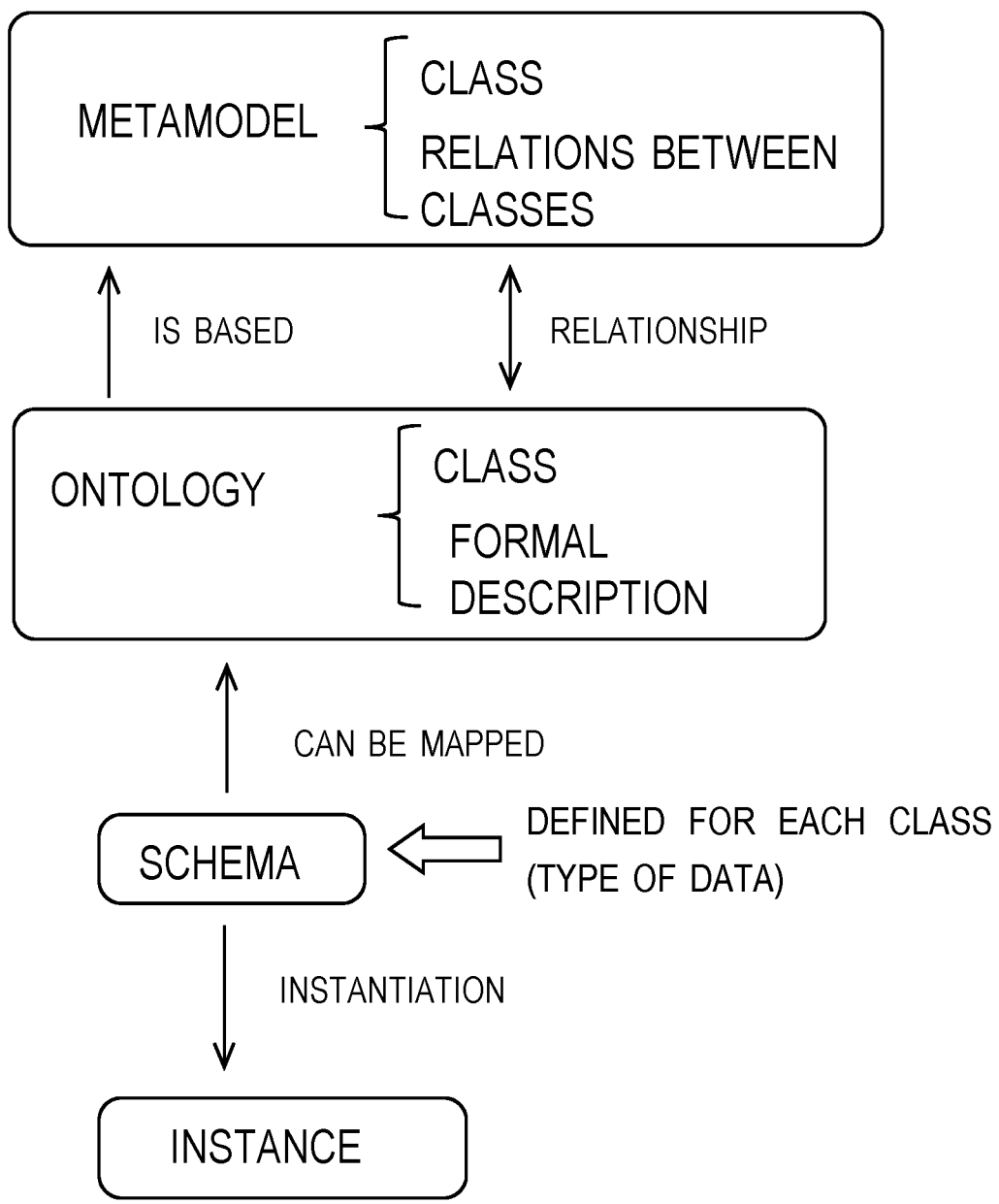
FIG. 4 is a diagram representing the relations between the data structures.

FIG. 3 is a diagram representing the terminology of data structures used in the information processing method and the information processing device according to the embodiment. FIG. 4 is a diagram representing the relations between the data structures. FIG. 3 includes a metamodel, ontology, a schema and an instance. Details of the metamodel were mentioned in the description of FIG. 2. The ontology defines the relations between the concepts and the attributes of the concepts, providing the specification of data. The ontology is a type of metadata. As represented in the middle of FIG. 2, the ontology includes a tree, codes assigned to each class and formal descriptions which are identifiers of the classes. Here, the tree presents the hierarchical classification of the classes. Examples of the codes include PW_E, G, GT, CW_S and C. The formal description is defined by using the codes. Examples of formal descriptions include +B and =B. As mentioned later, characters generated by concatenating the formal description to the sequence number can be used as the identifier of each instance.

The metamodel can be generated by a program. The metamodel can be also defined by the user. As illustrated in FIG. 4, the ontology is defined so that it is consistent with the metamodel. Thus, the classes in the metamodel and the classes in the ontology correspond to each other.

The schema presented in the bottom of FIG. 3 defines the format of actual data. In the example of FIG. 3, the first schema is defined as {code, rated efficiency, type, running time}. The second schema is defined as {code, type, value}. Thus, the schema describes a format including a plurality of data items. The instance presented in the bottom of FIG. 3 is the actual data which follows the format defined in the schema. The instance is a combination of multiple data items. The schema defines the attribute of the class. In the example of FIG. 3, the instance is {B001, temperature sensor, 100 degrees Celsius} and {B0002, flow sensor, 300 L/min}, including a plurality of values.

In the first instance, each data item in the second schema is specified by setting, code="B001", type="temperature sensor" and value="100 degrees Celsius". Similarly, in the second instance, each data item in the second schema is specified by setting, code="B002", type="flow sensor" and value="300 L/min". Thus, a plurality of instances which follow the format of the same schema may exist.

The metamodel, the ontology and the schema may be described by using any methodology. Definitions of data structures may be provided by using formats such as XML, JSON, CSV and text. However, the definitions of data may be provided by using other formats and standards.

As presented in FIG. 4, schemas are defined for each subclass. Therefore, if a plurality of subclasses is defined in the information processing device, a plurality of schemas is defined. Each of the schemas may have different formats.

As presented in FIG. 4, schemas and the corresponding classes are defined so that they are associated with the ontology. Since the classes defined in the ontology and the metamodel correspond to each other, it is possible to specify the subclass and the relation between subclasses by analyzing the instances in the first data.

The schema and the corresponding class may be defined by a program. Also, the user may define the schema and the corresponding class. The schemas and instances of FIG. 3 are only presented as examples. Therefore, schemas with different formats and instances with different data contents (values) may be used. The schemas can take any kind of format.

Figure 5:
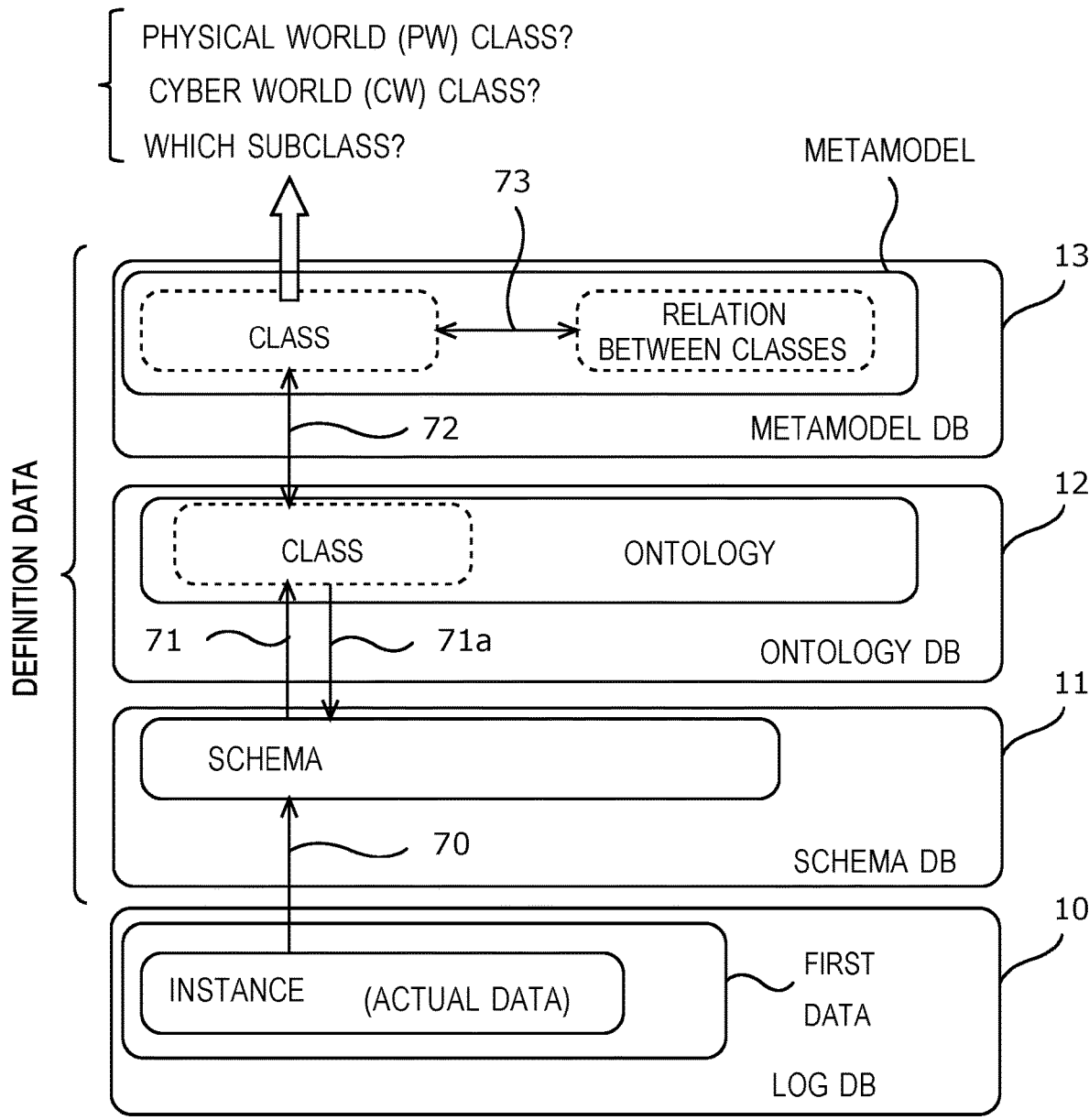
FIG. 5 is a diagram representing the structure of first data and definition data.

Next, data stored in the log database 10, the schema database 11, the ontology database 12 and the metamodel database 13 are described. FIG. 5 is a diagram representing the structure of first data and definition data. Below, explanation of the data is given with reference to FIG. 5.

In the log database 10, the log data including a set of first data is stored. Here, the first data includes instances (actual data) collected in the past. The first data may be saved along with information indicating the time when the data was obtained or measured. Also, the first data may be saved with information indicating the source of data. Examples of information indicating the source of data include the IP address, the MAC address, the name of sensor, the name of system, the name of module, the geometric address, coordinates, combinations of latitude and longitude and various identifiers. However, any type of information can be used. The log database 10 may store information indicating whether the type of data for each instance included in the first data are defined in the schema database 11 or not.

If the type of data for the instance is defined, the reference 70 to the definition of corresponding type of data and the definition of schema in the schema database 11 is saved in the log database 10. Examples of reference 70 include pointers, file names, names of objects and IDs. As long as the corresponding type of data and the schema could be specified, the reference 70 may be implemented in any fashion.

Various definition data are saved in the schema database 11, the ontology database 12 and the metamodel database 13. As mentioned above, the definition data provides definition of data from various aspects.

Information defining the type of data corresponding to the schema and the information defining the format of instance for each type of data (schema definition data) are stored in the schema database 11. Identifiers may be assigned to each type of data and schema. Then, the schema database 11 may store the identifiers. The identifiers can be alphanumeric characters, combination of alphanumeric characters and symbols, or letters which are descriptive of the data type and schema (for example, the name of the type of data and schema). However, the identifiers of any format can be used.

References 71 to the classes corresponding to each type of data and schema may be saved in the schema database 11. Examples of the reference 71 include pointers, file names, names of objects and IDs. As long as the data defining corresponding classes could be specified, the reference 71 may be implemented in any fashion. In the example of FIG. 5, the reference 71 is indicating a class defined in the ontology of the ontology database 12. However, the reference 71 may indicate classes defined in the metamodel of the metamodel database 13.

The ontology is stored in the ontology database 12. As mentioned above, the ontology includes the hierarchical classification of classes, the codes assigned to each class and information on the formal description. Identifiers may be assigned to the classes. Then, the ontology database 12 includes the identifiers. The identifiers can be alphanumeric characters, combination of alphanumeric characters and symbols, or letters which are descriptive of the classes (for example, the classification, the attribute and the name of classes). However, the identifiers of any format can be used.

References 71a to the type of data or the schema corresponding to each class may be stored in the ontology database 12. Examples of the reference 71a include pointers, file names, names of objects and IDs. As long as the data which defines the corresponding type of data and schema could be specified, the reference 71a may be implemented in any fashion.

The metamodel is saved in the metamodel database 13. Besides the ontology, the metamodel also provides the definition of each class. As illustrated in FIG. 2, the metamodel defines each class as subclasses of either the PW class or the CW class. Therefore, by accessing the metamodel database 13, it is possible to determine whether a class is defining data in the physical world or cyber world. Also, by referring to the PW relation type class or the CW relation type class, it is possible to obtain information on the relation between the classes (reference 73).

The identifiers of classes may be stored in the metamodel database 13. The identifiers can be alphanumeric characters, combination of alphanumeric characters and symbols, or letters which are descriptive of the classes (for example, the classification of the class, the attribute of the class or the name of class). However, the identifiers of any format can be used.

The data defining each of the classes in the ontology database 12 and the data defining each of the classes in the metamodel database 13 may be configured so that they could be referenced to each other. For example, the same class or the corresponding class may be specified by identifiers. The classes defined in both of the databases may be referred to each other by using pointers, file names or object names (reference 72). Other methods can be employed to implement the reference 72.

The data processor 8 obtains information on the schema of the instance, the class corresponding to the instance, the relation between classes and whether the instance belongs to the cyber world or the physical world, for instances (actual data) included in the first data, by using the references described in FIG. 5. By making the contents of the definition data comprehensive, the attributes, the relations and classification of continuously collected data could be obtained. Thereby, goals including effective control of facilities and accurate analysis of data are achieved.

Next, the structure of the first data collected by the data collector 7 is described with reference to FIG. 6. FIG. 6 is a diagram representing the structure of collected first data. As shown in pattern #1 (first data 80), the collected first data may include both the formal description data of the instance and the schema data of the instance. The schema data includes data which is sufficient for specifying at least the schema or the type of data. Examples of such data include definition of schemas and identifiers.

As shown in pattern #2 (first data 81), there are cases when the first data includes the instance (actual data) but the formal description data for the corresponding instance is not included. Also, as shown in pattern #2 (first data 82), there are cases when the first data includes the instance (actual data) but the schema data for the corresponding instance is not included. As shown in pattern #4 (first data 83), there are cases when the first data includes the instance (actual data) but both the formal description data and the schema data for the corresponding instance are missing. Since the first data takes different structures, the data processor 8 executes different processes depending on the structure of the first data.

As shown in pattern #5 (first data 84), the first data may include a plurality of instances. The first data 84 includes three instances (instances #1-#3). For the instance #2, it is possible to find the corresponding schema data #2. For the instance #3, it is possible to find the corresponding formal description data #3. However, with regards to the instance #1, both the corresponding schema data and the corresponding formal description data are missing.

Various methods can be used to make the instances, the formal description data, the schema data and the relations identifiable. For example, metadata, specific bit sequences and specific file names may be used. Other methods can be employed.

Below, the internal components of the information processing device 1 are described with reference to FIG. 1.

The schema updater 14 updates the schema database 11. For example, the schema updater 14 adds the definition of new types of data and the schema corresponding to the type of data (schema definition data) to the schema database 11. Also, the schema updater 14 writes data which specifies the reference to the subclass corresponding to the schema and the type of data.

The ontology updater 15 updates the ontology database 12. For example, the ontology updater 15 adds the new subclasses and formal descriptions to the ontology database 12. The metamodel updater 16 updates the metamodel database 13. For example, the metamodel updater 16 adds new subclasses to the metamodel database 13.

The schema updater 14, the ontology updater 15, the metamodel updater 16 may be programs which update the definition data when certain conditions are fulfilled. The definition data may be updated based on the instructions transmitted from the data processor 8 or the human interface device 19b.

The data relation referrer 17 accesses the metamodel database 13 to obtain information on the relation a specific subclass has. The corresponding information is transmitted to the user and the external information processing device via the notification device 18.

The notification device 18 notifies information including the type of data, schema and the subclass inferred and determined by the data processor 8, to the user or the external information processing device. The notification device 18 also notifies the relation of the subclass obtained by the data relation referrer 17, to the user or the external information processing device. The notification device 18 may use any method to notify information. For example, the notification device 18 may notify information by sending e-mails or short mails. Also, the notification device 18 may notify information by updating web pages. The notification device 18 may write the information to storage spaces provided by external storage devices. Also, the notification device 18 may transmit information to control devices and servers which analyze the data.

The schema updater 14, the ontology updater 15, the metamodel updater 16, the data relation referrer 17 and the notification device 18 may be implemented by hardware circuitry such as processors (CPUs), ASICs and CPLDs. The schema updater 14, the ontology updater 15, the metamodel updater 16, the data relation referrer 17 and the notification device 18 may be also implemented by programs such as the operating systems and applications, or the combination of the above.

The display 19a displays the GUI (Graphical User Interface) or CLI (Command Line Interface) used by the user operating the information processing device 1. Also, the display 19a may display the editing screen of definition data and the result of inference. Examples of the display 19a include liquid crystal displays, electroluminescence displays, projectors and LED displays. However, any type of display can be used. In the example of FIG. 1, the display 19a is embedded in the information processing device 1. However, the location of installation is not limited. For example, the display 19a may be located in a room or a building which is remote from the information processing device 1. The display 19a may be the display of wireless communication terminals including tablets and smartphones.

The human interface device 19b provides the users methods for operating the information processing device 1. Examples of the human interface device 19b include a keyboard, a mouse, a switch or a voice recognition device. However, other devices may be used. The human interface device 19b may be a touch panel which is integrated with the display 19a. The human interface device 19b may be installed in any location. The human interface device 19b may be installed in a room or a building which is remote from the information processing device 1. The human interface device 19b may be the touch panel of wireless communication terminals including tablets and smartphones.

Figure 7:
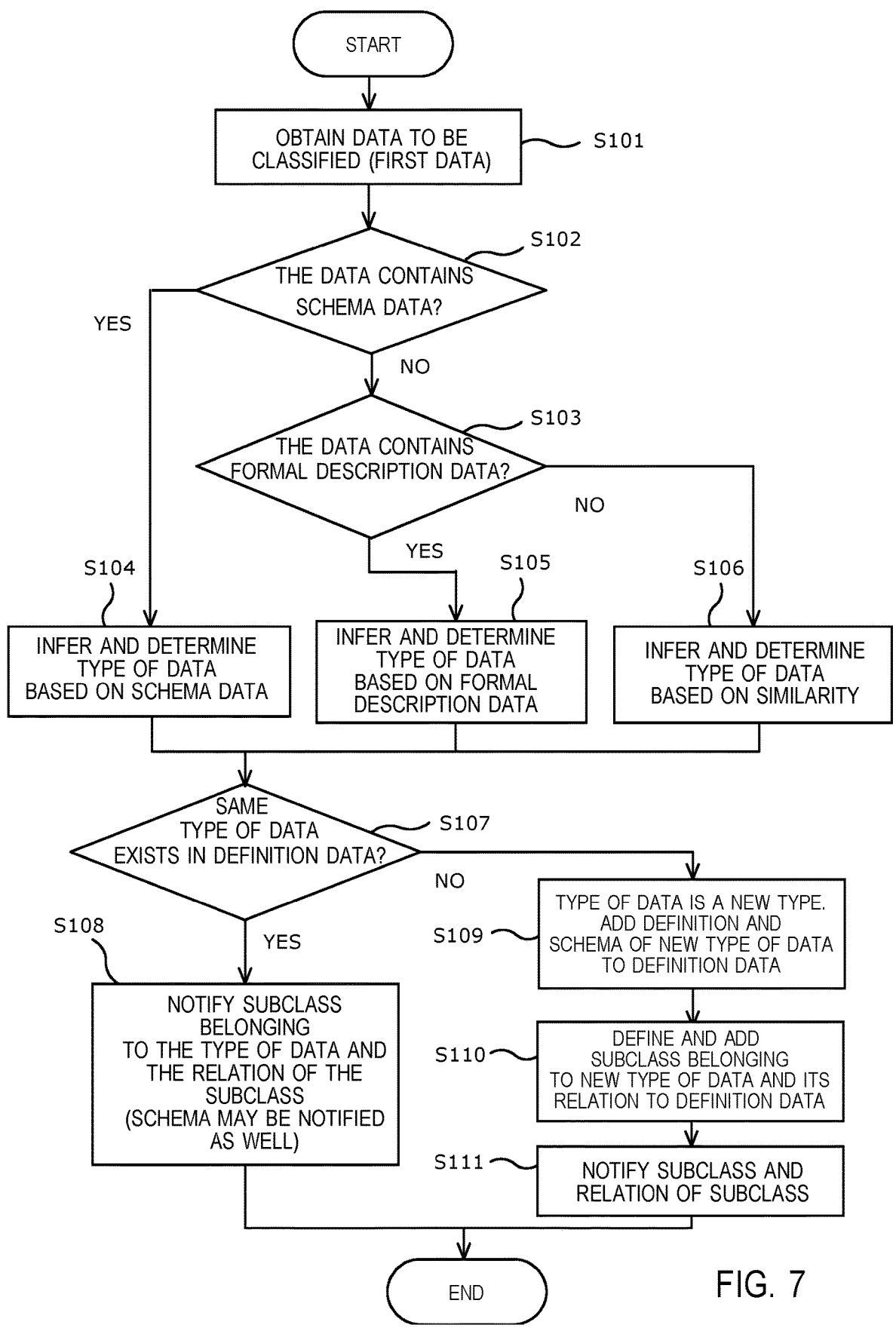
FIG. 7 is a flowchart describing the overall process in the first embodiment.

Next, the process executed by the information processing device of the embodiment is explained. FIG. 7 is a flowchart describing the overall process in the first embodiment. Below, the process is described with reference to FIG. 7.

First, the data collector 7 obtains the data (first data) to be classified (step S101). As mentioned above, the data which is actually classified is the actual data (instance) included in the first data. The metadata (schema data and formal description data) included in the first data provide information necessary for the classification process.

If the first data is transmitted from the data collector 7 to the data processor 8, it is determined whether the first data contains schema data corresponding to the instance included in the first data (step S102). If the first data contains the corresponding schema data (YES in step S102), the data processor 8 infers and determines the type of data for the instance, based on the schema data (step S104). If the first data does not contain the corresponding schema data (NO in step S102), the data processor 8 determines whether the formal description data corresponding to the instance is included in the first data (step S103).

If the corresponding formal description data is included in the first data (YES in step S103), the type of data is inferred and determined based on the formal description data (step S105). If the corresponding formal description data is not included in the first data (NO in step S103), the type of data is inferred and determined based on similarity (step S106).

Thus, the data processor 8 selects the method used for determining the type of data based on the metadata included in the first data. Details of the processes executed in the steps S104, S105 and S106 are described later. If the first data includes a plurality of instances (as shown in pattern #5 (first data 84) of FIG. 5), the processes of steps S102-S106 are executed for each instance.

If the processes of steps S104-S106 are executed, the data processor 8 confirms whether the determined type of data is defined in the definition data or not (step S107). For example, the data processor 8 searches the schema database 11 to find the corresponding type of data.

If the same type of data is defined in the definition data (YES in step S107), the subclass corresponding to the type of data and the relation of the subclass is notified (step S108). Specifically, the data processor 8 refers to the ontology database 12 to specify the subclass corresponding to the type of data. Then, the data relation referrer 17 accesses the metamodel database 13 to obtain the relation the corresponding subclass has. Finally, the notification device 17 may notify the above information to the user and the external information processing device. Information on whether the instance belongs to the physical world or the cyber world can be notified as well. The notification device 18 can display information including the subclass corresponding to the type of data and the relation of subclass to the display 19a. Also, the schema data corresponding to the type of data may be notified based on needs.

If the same type of data is not defined in the definition data (NO in step S107), the data processor 8 determines that the instance corresponds to a new type of data. The definition of the schema (the schema definition data) corresponding to the new type of data is added to the schema database 11 (step S109). The process of adding the new type of data and the corresponding schema can be executed by a program. Also, the user may add the new type of data and the corresponding schema manually by using the human interface device 19b.

Next, the definition of the subclass corresponding to the new type of data is defined. The definition of the subclass and the relation of the subclass are added to the definition data (step S110). Specifically, the definition of the new subclass is added to the ontology database 12 and the metamodel database 13. The new subclass is defined as the subclass of either the PW class or the CW class. In the PW relation type class or the CW relation type class of the metamodel, information on the relation between the subclasses may be added. If the new subclass does not have any relations with other subclasses, addition of information on the relation can be skipped. The process of step S110 can be executed by a program. Also, the process of step S110 may be performed by the user via the human interface device 19b.

Next, information on the subclass to the instance is belonging to and the relation the subclass has is notified (step S111). The process executed in step S111 is similar to the process executed in step S108. However, if definitions of new types of data, schemas, subclasses or relations are added to the definition data, the fact that the definition data is updated can be displayed on the display 19a. Also, the update of the definition data may be notified to the user or the external information processing device. Thereby, the user and other systems can refer to the updated definition data.

In the following, the process of determining the type of data is described in detail.

Figure 8:
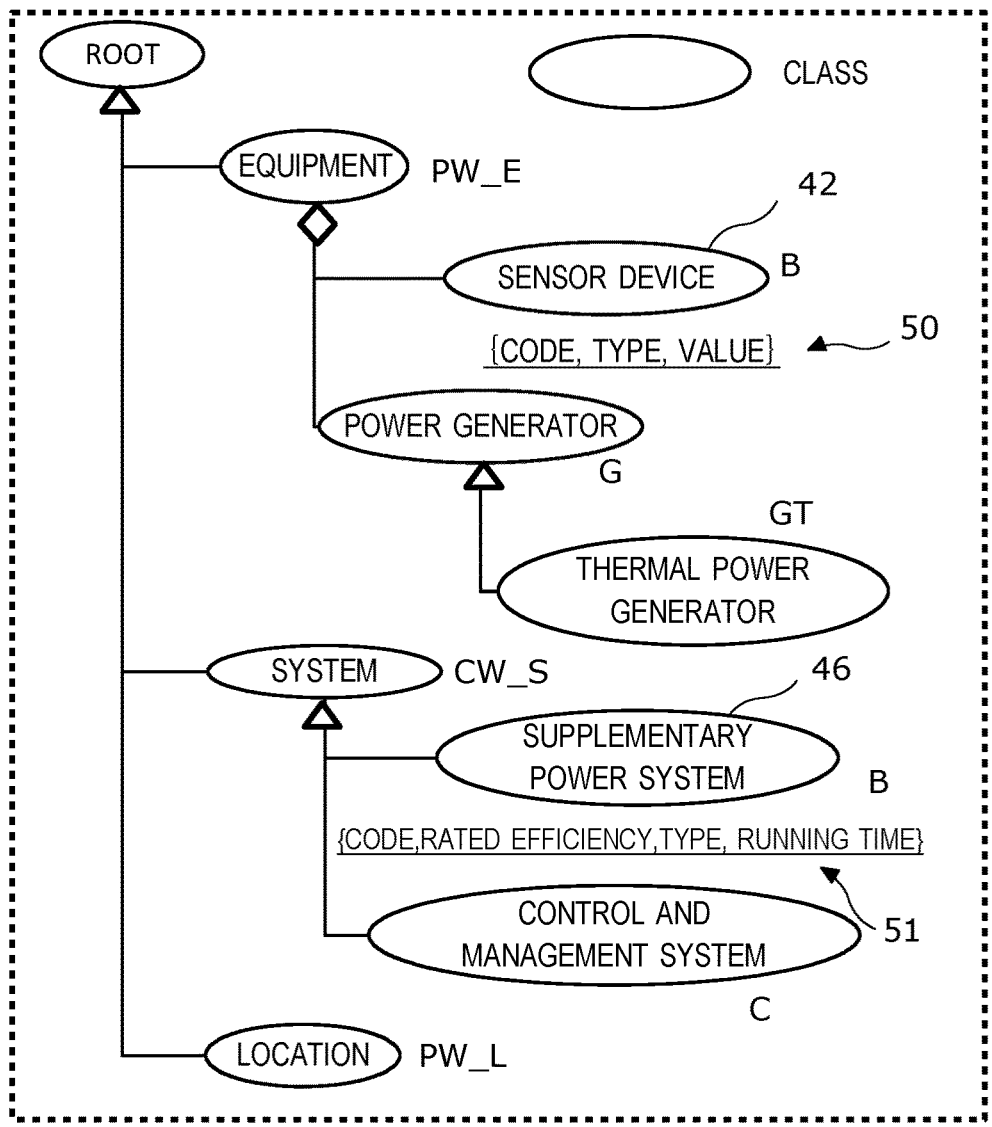
FIG. 8 is a diagram representing the relation between classes, schemas and instances in hierarchical classification.

First, the relation between the schema and the other metadata is described. FIG. 8 is a diagram representing the relation between classes, schemas and instances in hierarchical classification. In the top of FIG. 8, an example of the hierarchical classification of classes is described. A schema 50 of the sensor device class (class 42) is defined as the "{code, type, value}". The schema 51 of the supplementary power system class (class 46) is defined as the "code, rated efficiency, type, running time".

Table 52 and table 53 in the bottom of FIG. 8 describe the relation between the schema and the instance. The first row of table 52 corresponds to the schema 50. The second and third rows of table 52 include examples of instances (the actual data) with the format defined by the schema 50. The first row of table 52 corresponds to the schema 51. The second row of table 53 includes an example of an instance (the actual data) with the format defined by the schema 51.

Details of the hierarchical classification of classes are mentioned later.

Figure 9:
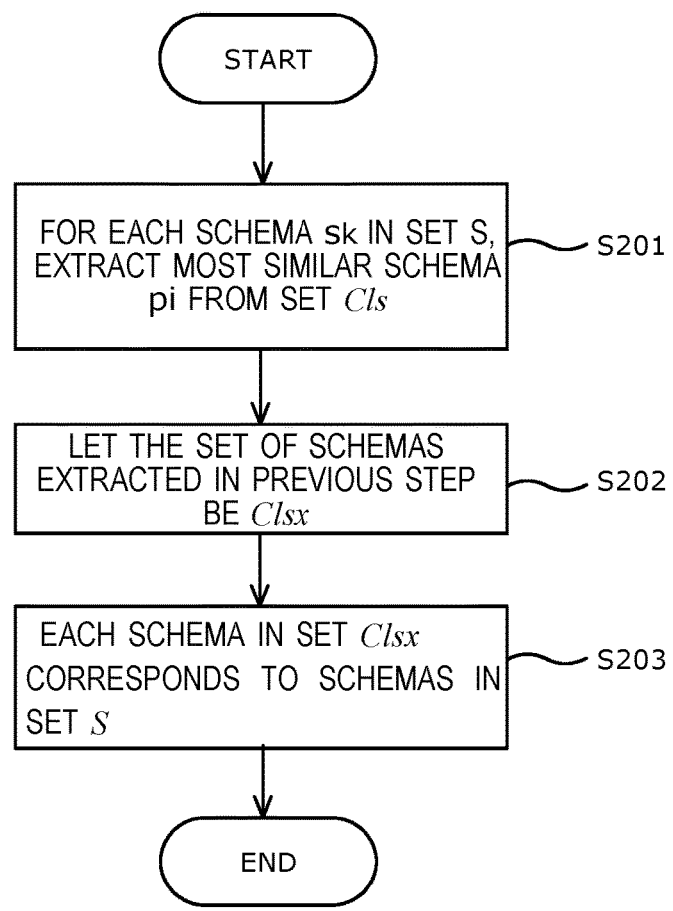
FIG. 9 is a flowchart describing the process of determining data types of instances based on schemas.

Next, the process executed in step S105 of FIG. 7 is described in detail. FIG. 9 is a flowchart describing the process of determining data types of instances based on schemas.

Here, the notations used in FIG. 9 are described. If m schemas are defined in the schema definition data, the set of schemas Cls is expressed, Cls=[$p_1$, $p_2$, $p_3$, . . . , $p_m$]. Each schema is expressed, $p_i$={$x_1$, $x_2$, $x_3$, $x_4$} where the values of i are 1, 2, 3, . . . and m. Each data item in the schema is $x_j$ where the values of j are 1, 2, 3 and 4. For example, referring to the schema 51 in FIG. 8, "code", "rated efficiency", "type" and "value" corresponds to the data item of the schema.

The first data collected by the data collector 7 may be described by using similar notations. If n schemas are included in the first data, the set of schemas S is expressed, S=[$s_1$, $s_2$, $s_3$, . . . , $s_n$]. Each schema is expressed, $s_k$={$y_1$, $y_2$, $y_3$, $y_4$} where the values of k are 1, 2, 3, . . . , n. Here, $y_j$ corresponds to each data item defined in the schema. Since a plurality of instances corresponding to the same schema (type of data) may exist, the first data can include a plurality of instances corresponding to the same schema $s_k$ (type of data).

In the example above, the number of data items included in the schema is 4. However, the number of data items included in the schema can be different.

For each schema $s_k$ included in the set of schemas S, the schema $p_i$ which is most similar to the schema $s_k$ is extracted from the set Cls (step S201). In step S201, the similarity is calculated. The most similar schema $p_i$ is selected based on the similarity. Methods which can be used for calculating the similarity include Simpson coefficients, WORDNET and TF-IDF. However, other methods may be used. It is possible to set threshold values in the calculation process of step S201. If the similarity is less than the threshold value, it is likely that the schemas are different. Then, the result may be labeled as "confirmation necessary". Examples of processes using Simpson coefficients are described later.

Next, the set of schemas $p_i$ extracted in step S201 is defined as the set Clsx (step S202). Set Clsx is a subset of set Cls. It is inferred and determined that each schema in set Clsx corresponds to each schema in the set S (step S203). The relationships of schemas inferred and determined in step S203 may be presented on the display 19a. Also, the relationships of schemas inferred and determined in step S203 may be notified to the user from the notification device 18. If the results include the "confirmation necessary" label, the user may edit the inferred results via the human interface device 19b. The values of similarity may be presented together with the results.

Figure 10:
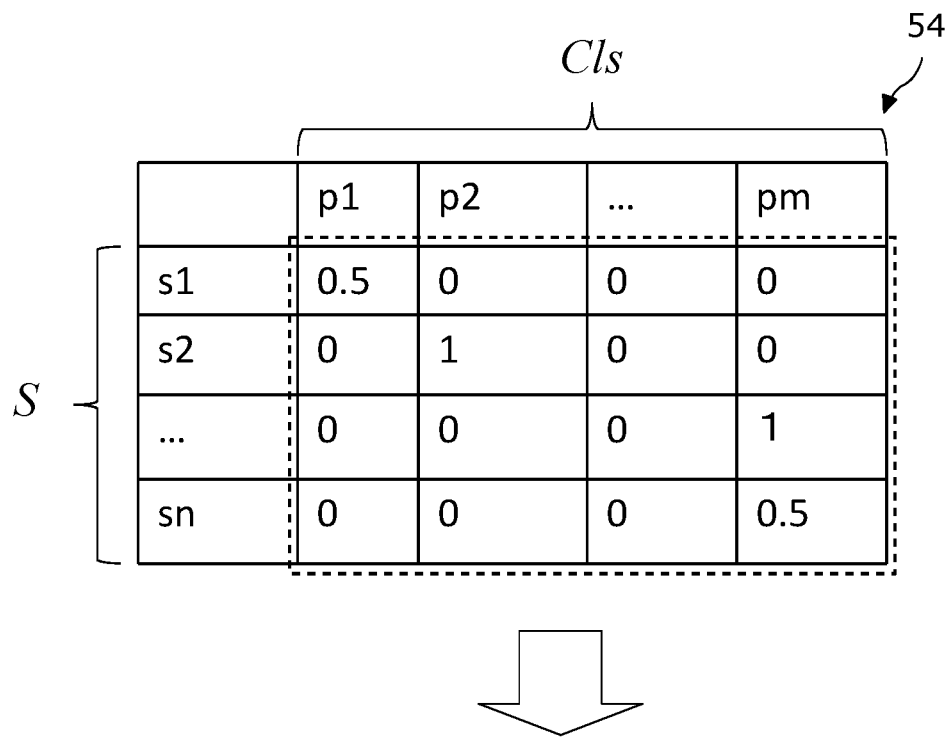
FIG. 10 is a diagram describing the process of extracting the most similar schema.

FIG. 10 is a diagram describing the process of extracting the most similar schema. In the example of FIG. 10, Simpson coefficients are used in the calculation of similarity. The Simpson coefficients are calculated by dividing the number of elements in the intersection of set X and set Y with the number of elements in the smaller one of set X and set Y. Table 54 is an example of the data structure used in the calculation of Simpson coefficients.

The first row of table 54 represents the set Cls (the set of schemas which are defined in the definition data). The first column of table 54 represents the set S (the set of schemas included in the first data). Fields of table 54 include the values of Simpson coefficients calculated for each combination of schema $p_i$ and $s_k$.

In the example of FIG. 10, the threshold value of similarity is set to 0.9. Therefore, if the value of Simpson coefficient is smaller than 0.9, the result is labeled as "confirmation necessary".

Figure 11:
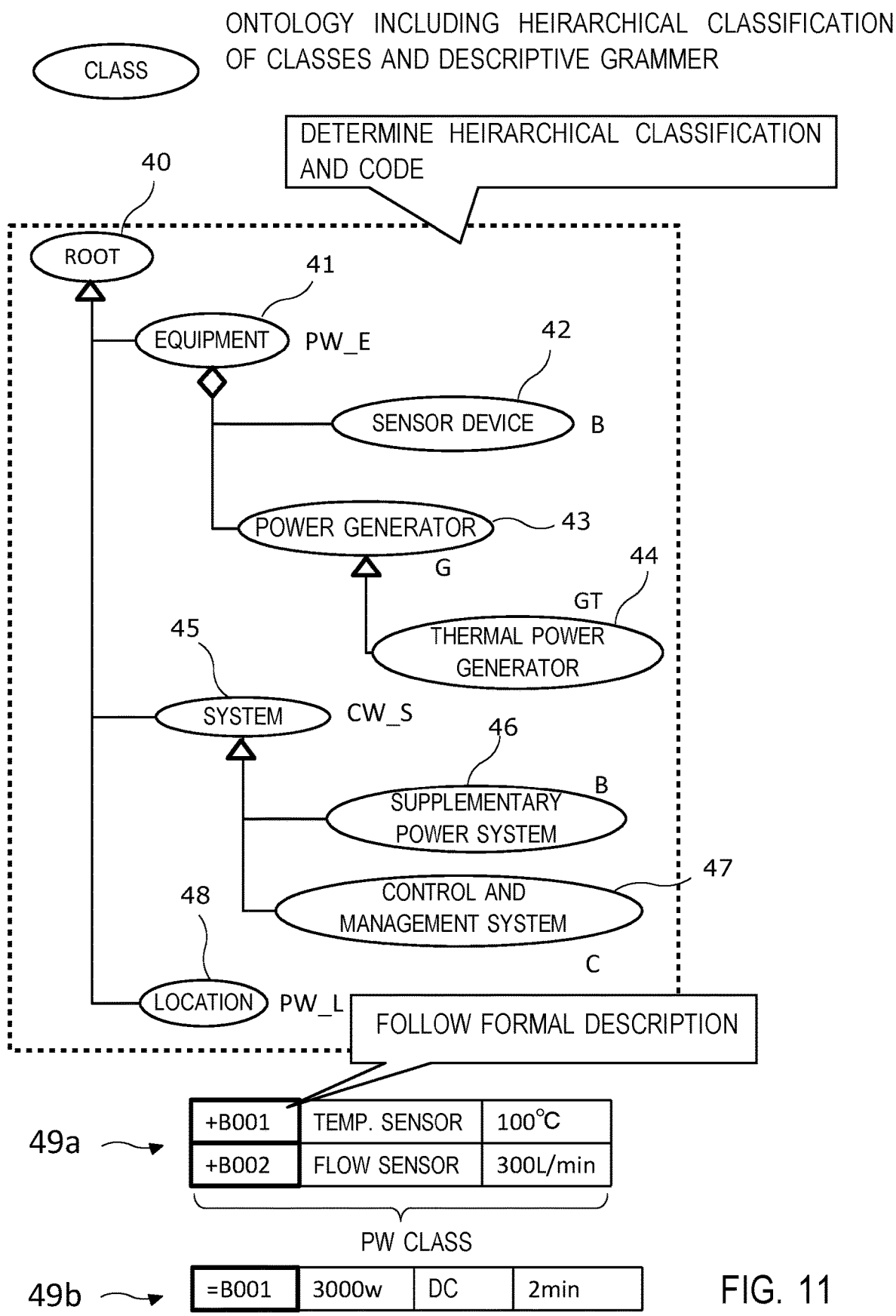
FIG. 11 is a diagram representing an example of ontology including hierarchical classification of data and formal descriptions.

Next, an example of ontology including the hierarchical classification of classes and formal description is described. FIG. 11 is a diagram representing an example of ontology including hierarchical classification of data and formal descriptions.

In FIG. 11, the hierarchical classification of classes is presented. In the example of FIG. 11, an equipment class (class 41), a system class (class 45) and a location class (class 48) are defined as subclasses of the root class (class 40). A sensor device class (class 42) and a power generator class (class 43) are defined as subclasses of the equipment class. A thermal power generator class (class 44) is defined as the subclass of the power generator class. Also, a supplementary power system class (class 46) and control and management system class (class 47) are defined as subclasses of the system class.

Thus, the hierarchical classification of classes has a tree-structure. In the tree-structure, each node corresponds to the classes. The shape of tress, the name of classes and the number of classes presented in FIG. 11 are only examples. Therefore, the information processing device 1 may use names which are different from the examples. Also, the number of defined classes may be different. In FIG. 11, the depth of the tree is 4. However, the actual depth of the tree may be different. If more classes are added to the definition data, the number of defined classes would increase. Then, the depth of the hierarchical classification might become greater than 4.

In order to make each class identifiable, codes may be assigned to each class. In the example of FIG. 11, the code "PW_E" is assigned to the equipment class (class 41). The code "G" is assigned to the power generator class (class 43). The code "GT" is assigned to the thermal power generator class (class 44). Since the code "GT" include the code "G", it is possible to assume that the thermal power generator class with code "GT" is a subclass of the power generator class with code "G".

The bottom of FIG. 11, examples of instances including the formal description of data is presented. For example, instances belonging to the PW class can have "+" as the prefix. Instances belonging to the CW class can have "=" as the prefix. These prefixes are only examples. Therefore, different prefixes may be used.

The instances in table 49a indicate the measured values of the temperature sensor (abbreviated as the temp. sensor) and the flow sensor. Both of the instances belong to the sensor device class (code "B"). Since the sensor device class is a subclass of the equipment class (code "PW_E"), the sensor device class is a subclass of the PW class. Referring to the first row of table 49a, "+B001" and "+B002" are used as the identifiers of instances. These identifiers are generated by concatenating the formal description "+B" with the sequence numbers. Both of the instances shown in table 49a correspond to the actual data of schema 50 in FIG. 8.

The instance in table 49b belongs to the supplementary power system class, describing data related of the supplementary power system. Since the supplementary power system class is a subclass of the system class (code "CW_S"), the supplementary power system class is a subclass of the cyber world class. Referring to the first column of table 49b, "=B0001" is used as the identifier of the instance. This identifier is generated by concatenating the formal description "=B" with the sequence number. The instance shown in table 49b corresponds to the actual data of schema 51 in FIG. 8.

The codes and formal description of class in FIG. 11 are only examples. Therefore, it is possible to define the codes and formal description of classes differently. The codes and formal descriptions of classes may be defined by alphanumeric characters, letters, symbols or the combination of the above. Also, the codes and formal descriptions of classes may be defined by using specific bit strings.

Figure 12:
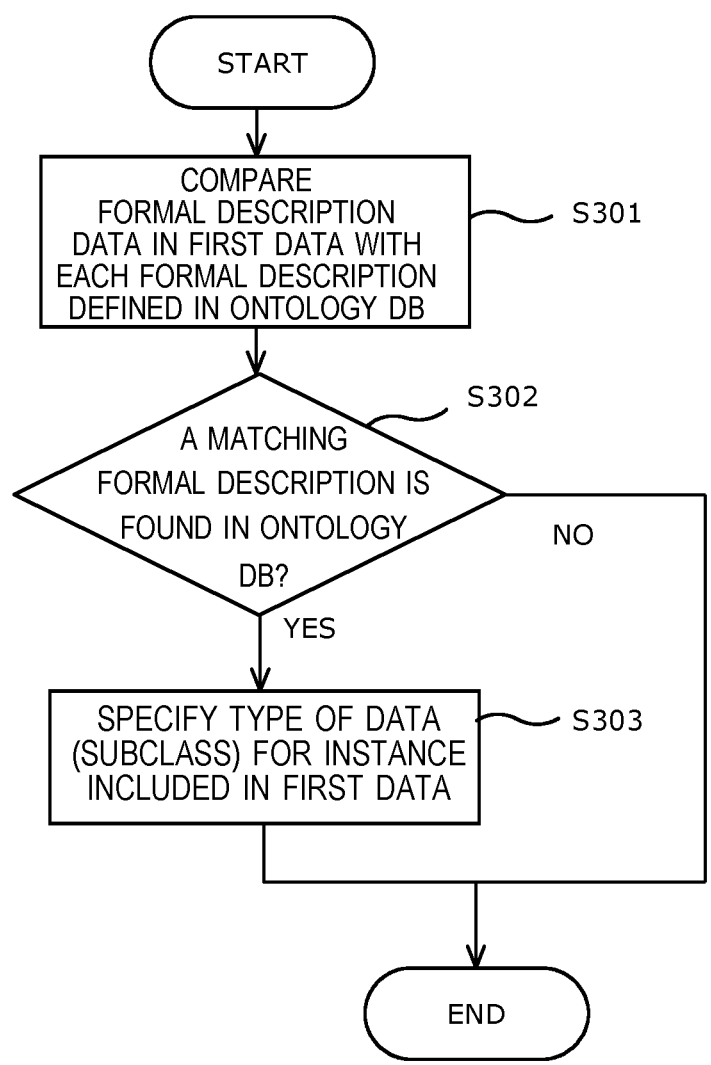
FIG. 12 is a flowchart describing the process of determining the type of data for the first data based on the ontology.

FIG. 12 is a flowchart describing the process of determining the type of data of the first data based on the ontology. FIG. 12 describes the details of the process executed in step S105 of FIG. 7. In the following, the process is described with reference to FIG. 12.

First, the formal description data included in the first data (first formal description data) is compared with each formal description defined in the ontology database 12 (second formal description data) (step S301). If the matching formal description is defined in the second formal description data of the ontology database 12 (YES in step S302), the type of data (subclass) included in the first data is specified (step S303). If the matching formal description is not defined in the second formal description data of the ontology database 12 (NO in step S302), the process of FIG. 12 is finished. Then, the process of step S106 in FIG. 7 is executed. If the process of FIG. 12 is applied to the instances in tables 49a, 49b of FIG. 11, the formal descriptions "+B" and "−B" would be compared.

Next, detail of the process executed in step S106 of FIG. 7 is described. In step S106, the type of data is inferred and determined based on similarity. The text-based method (first method) and the machine learning-based method (second method) are examples of the methods for determining type of data based on similarity. In the following, description given in the order of the first method and the second method.

Figure 13:
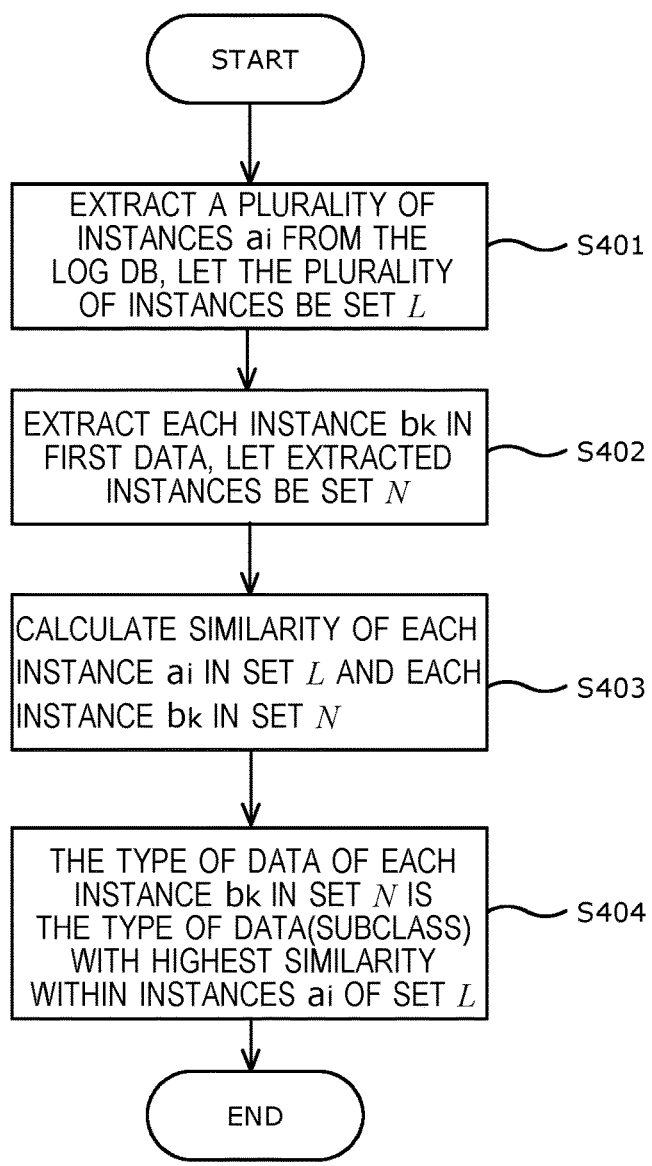
FIG. 13 is a flowchart describing the first method for determining the type of data for instances based on the similarity of instances.

FIG. 13 is a flowchart describing the first method for determining the type of data for instances based on the similarity of instances. The process is explained in reference to FIG. 13.

Here, the notation used in FIG. 13 is explained. A set of instances L including the m instances stored in the log database 10 is expressed, L=[$a_1$, $a_2$, $a_3$, . . . , $a_m$]. Each instance is expressed, $a_i$={$g_1$, $g_2$, $g_3$, $g_4$} where the values of i are 1, 2, 3, . . . , m. Here, $g_j$ indicates the value of each data item in the instance, where the values of j are 1, 2, 3 and 4. For example, for the instance in table 49b of FIG. 11, "=B0001", "3000w", "direct current" and "2 minutes" corresponds to the values of the data items.

Similar notations may be used to describe the first data obtained by the data collector 7. If n instances are included in the first data, the set of instances N is expressed, N=[$b_1$, $b_2$, $b_3$, . . . , $b_n$]. Each instance is expressed, $b_k$={$h_1$, $h_2$, $h_3$, $h_4$} where the values of k are 1, 2, 3, . . . , n. Here, $h_j$ is the value of each data item in the instance. Since the first data may include instances of the same type of data and the same values, duplicates are allowed for $h_k$.

In the example, the number of data items in the instance is 4. However, the number of data items in the instances may be different.

First, a plurality of instances $a_i$ included in the log database 10 is extracted. The plurality of instances $a_i$ forms the set of instances L (step S401). Then, each instance $b_k$ included in the first data is extracted. The extracted instances form the set N (step S402). Next, the similarity of each instance $a_i$ included in the set L and each instance $b_k$ included in the set N are calculated (step S403). Finally, it is inferred and determined that the type of data (subclass) for the instance $b_k$ is the type of data (subclass) of the instance $a_i$ which has the highest similarity with the instance $b_k$ (step S404).

Figure 14:
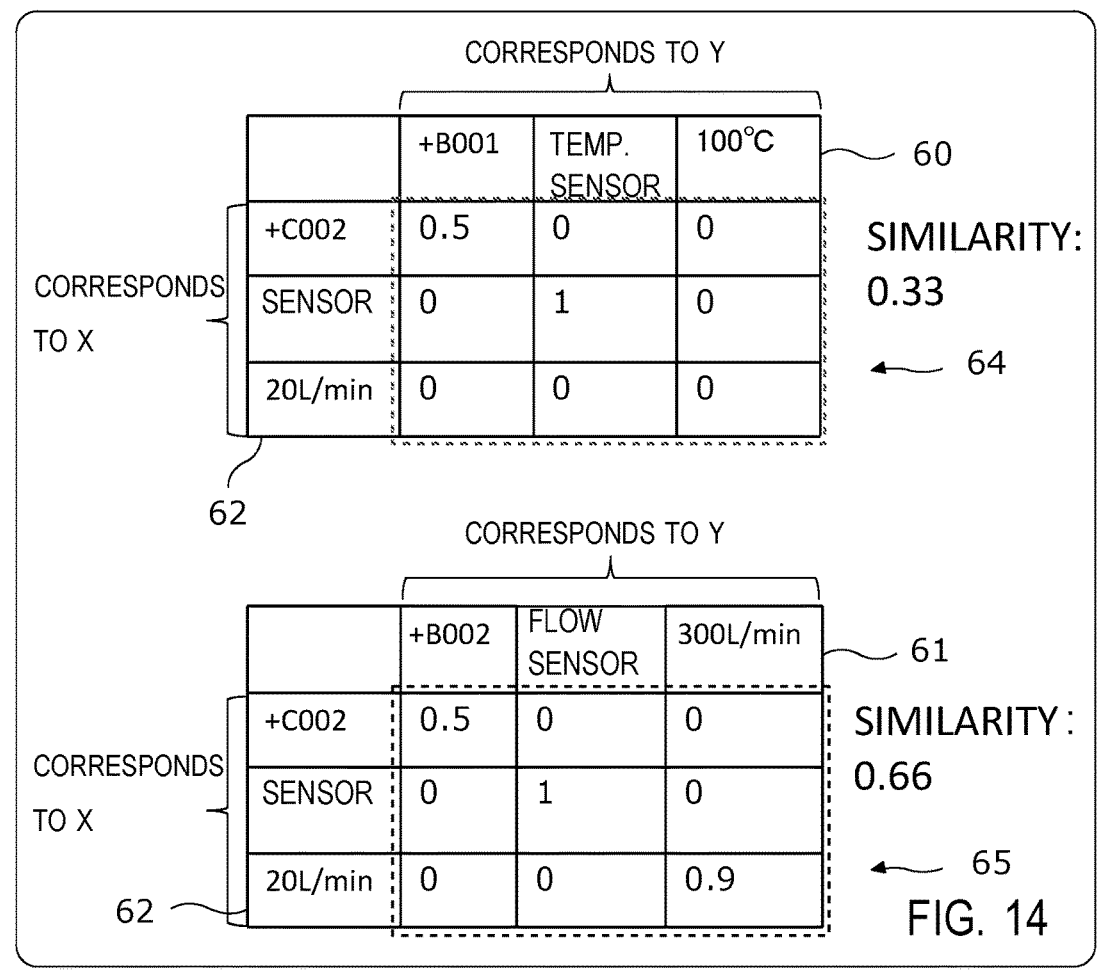
FIG. 14 is a diagram describing the first method for calculating the similarity based on values of instances.

Next, details of the process when the first method is used are explained. FIG. 14 is a diagram describing the first method for calculating the similarity based on values of instances.

Instances 60 and 61 of FIG. 14 are examples of the instance $a_i$ stored in the log database 10. Instances 62 and 63 are examples of the instance $b_k$ included in the first data.

In the example of FIG. 14, Simpson coefficients are calculated to obtain the similarity between the instances. The use of Simpson coefficients is only an example of the calculation methods of similarity. Other calculation methods including WORDNET and TF-IDF can be used.

In FIG. 14, tables 64 and 65 storing the calculated Simpson coefficients are shown. The table 64 includes the Simpson coefficients calculated by combining the instance 60 and the instance 62. Table 65 includes the Simpson coefficients calculated by combining the instance 61 and the instance 62. It is possible to set threshold values for the similarity. If the calculated similarity is smaller than the threshold value, a flag requiring the confirmation of inferred type of data may be set. If this flag is set, the user can check the inferred type of data. Depending on the result, the user can amend the type of data.

Next, details of the process when the second method is used are explained. FIG. 15 is a flowchart describing the second method for determining the type of data for instances based on the similarity of instances. In the following, the process is explained in reference to FIG. 15.

Here, the notation used in FIG. 15 is explained. Letters and symbols are removed from the m instances stored in the log database 10, generating data $a'_i$ only with numbers. A set L' of data $a'_i$ is expressed, L'=[$a'_1$, $a'_2$, $a'_3$, . . . , $a'_m$]. Each data $a'_i$ is expressed, $a'_i$={$g'_1$, $g'_2$, $g'_3$, $g'_4$} where the values of i are 1, 2, 3, . . . and m. Here, $g'_j$ corresponds to the value of each data item in the data $a'_i$ where the values of j are 1, 2, 3 and 4.

The first data collected by the data collector 7 may be expressed using similar notations. Letters and symbols are removed from the n instances included in the first data, generating data $b'_k$ only with numerical data. A set N' of data $b'_k$ is expressed, N'=[$b'_1$, $b'_2$, $b'_3$, . . . , $b'_n$]. Each data is noted, $b'_k$={$h'_1$, $h'_2$, $h'_3$, $h'_4$} where the values of k are 1, 2, 3, . . . and n. Here, $h'_j$ is the value of each data item in the data $b'_k$. Duplicates are allowed for the value of $h'_j$.

In the example, the number of data items included in the data $b'_k$ is 4. However, the number of data items included in the data $b'_k$ may be different.

First, a set L' of data $a'_i$ only with numerical data is generated by removing letters and symbols from each instance stored in the log database 10 (step S501). Next, a set N' of data $b'_k$ only with numerical data is generated by removing letters and symbols from each instance included in the first data (step S502). In the processes of steps S501 and S502, the process of removing letters and symbols can be skipped for the identifiers of instances (for example, the formal description and the sequence number), to keep the uniqueness of identifiers.

Then the similarity of each data $a'_i$ in set L' and each data $b'_k$ in set N' is calculated by using machine learning-based methods (step S503). Finally, it is inferred and determined that the type of data (subclass) for the instance $b'_k$ is the type of data (subclass) for the instance $a'_i$ which has the highest similarity with the instance $b'_k$ (step S504).

Next, an example of process using the second method is explained. FIG. 16 is a diagram describing the second method for calculating the similarity based on values of instances.

Data 66 and 67 are shown as examples of data $a'_i$ in FIG. 16. Also, data 68 is shown as an example of data $b'_k$. Data 66 to 68 are generated by removing letters and symbols from each data item except the identifiers of instance (for example, the formal description and the sequence number).

Examples of methods for calculating similarity by using machine learning-based methods include hierarchical clustering and nonhierarchical clustering. Examples of distances used for classifying clusters include Euclid distances, Mahalanobis distances and Cosine distances. Examples of methods used for merging clusters include the Ward method, the group average method, the minimum distance method and the maximum distance method. However, any method can be used. Besides clustering, there are methods using the correlation of numbers. However, any type of method can be used.

In above, cases when the calculation of similarity is executed to search the most similar schema were explained (for example, FIG. 9 and FIG. 10). Also, cases when the calculation of similarity is executed to search the most similar instance were explained (for example, FIG. 13-16). In the following, the similarity calculated for the former purpose is called the first similarity. The similarity calculated for the later purpose is called the second similarity.

In the example of FIG. 16, hierarchical clustering was used. It was inferred and determined that the instance with the identifier "C002" is most similar to the instance with the identifier "B0002".

If the instances in the first data and the instances in the log data base need to be distinguished, the former instance is called the first instance and the later instance is called the second instance. The subclass the second instance belongs to is defined in the definition data.

In the flowchart of FIG. 7, the process executed to infer and determine the type of data for instances included in the first data differed depending on the metadata (specifically, schema data and first formal description data) included in the first data. However, the flowchart of FIG. 7 is presented only as an example. Therefore, the priority of the executed process can be different from the order of step S104, step S105 and step S106. Also, the criteria used for determining the process to be executed can be different from FIG. 7. For example, the information processing device may execute parts of the processes described in step S104, step S105 and step S106. Also either of the above steps may be executed selectively.

Next, the screen displayed by the information processing device according to the embodiment is explained. First, a screen displaying the results of inference for the first data is described.

FIG. 17 is an example of a screen displayed to the display 19a in step S108 of FIG. 7. The screen of FIG. 17 is an example of a GUI (Graphical User Interface) presenting the inferred and determined classification (type of data/subclass) of instances included in the first data.

The screen of FIG. 17 shows the case when the instance in the first data is the combustion gas temperature in the inlet of a second gas turbine in a thermal power plant. It has been inferred and determined that the class of the corresponding instance is "gas turbine" while the schema is "temperature". Also, it is shown that the subclass corresponding to "class: gas turbine/schema: temperature" is the "temperature sensor" subclass. Due to the parent-child relationship (inheritance) of classes, the "temperature sensor" subclass is a subclass belonging to the physical world.

Also, as the subclasses which have relations with the "temperature sensor" subclass, the "rotation speed configuration" subclass and the "exhaust gas temperature configuration" subclass are presented in the screen. Both the "rotation speed configuration" subclass and the "exhaust gas temperature configuration" subclass are subclasses of the CW (cyber world) class. The screen in FIG. 17 is showing that similarity is used for determining the type of data (subclass). Also, it is shown that the similarity was greater than the threshold value. Therefore, in the example of FIG. 17, messages requiring the user to confirm the results are not displayed.

In the bottom of FIG. 17, buttons 90, 91 are located. If the user clicks the button 90, the user can edit the results shown in the screen. Examples of screens for editing the results include the screen shown in FIG. 18. If the user clicks the button 91, the data corresponding to the results shown in the screen are saved to the log database 10.

Figure 18:
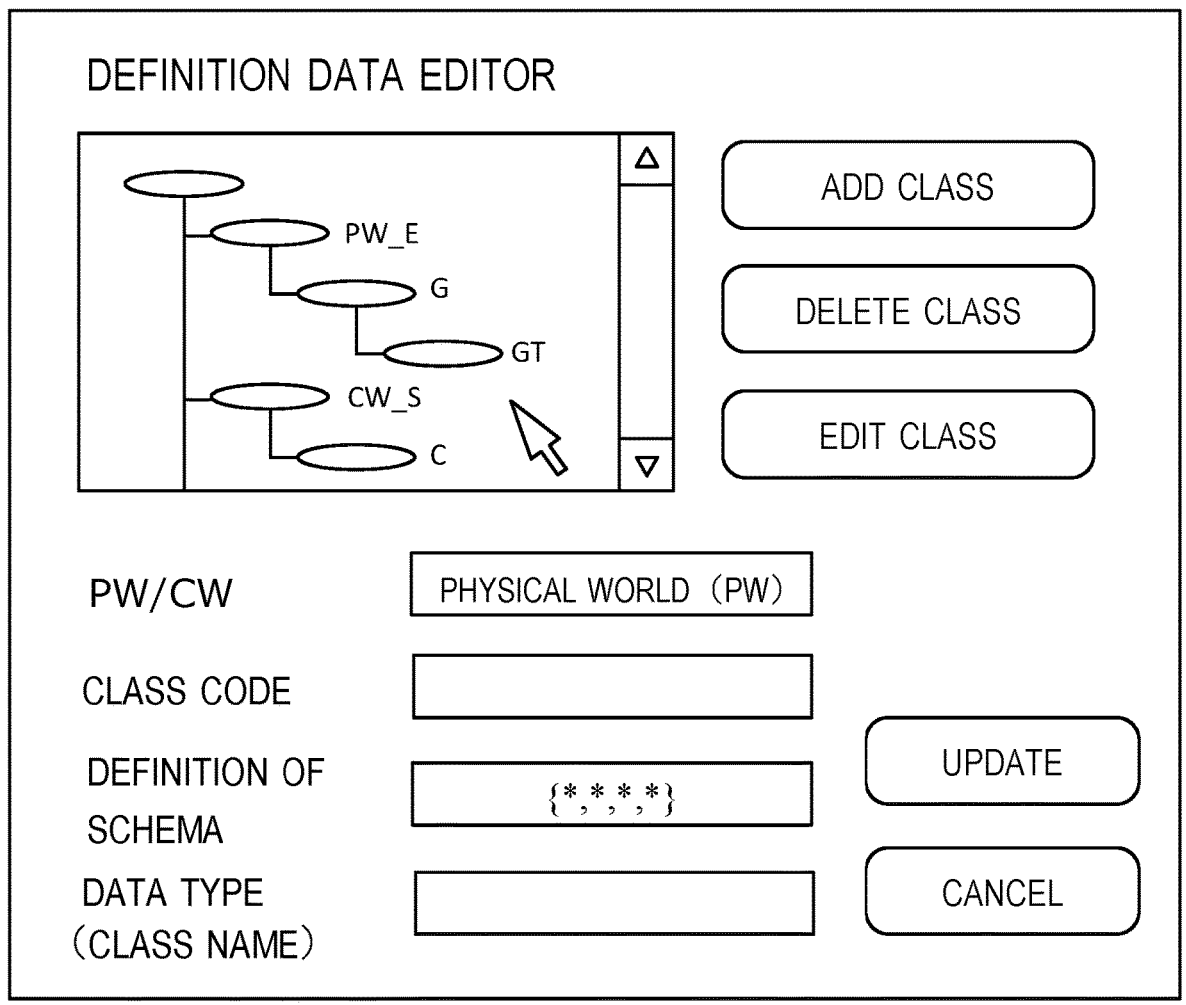
FIG. 18 is a diagram illustrating an example of a screen for editing definition data.

FIG. 18 is a diagram illustrating an example of a screen for editing definition data.

FIG. 18 is an example of a GUI provided for editing the contents of the definition data. In the screen of FIG. 18, operations including the addition of classes, deletion of classes and modification of classes can be performed by the user. For example, classes can be switched between the PW (physical world) class and the CW (cyber world) class. Also, the codes of the classes can be configured. Schemas corresponding to the classes can be defined. Also, the type of data corresponding to the classes can be entered. The hierarchical classification of classes is displayed in the box, in the upper-left hand side of FIG. 18. The user can check the configuration of the definition data while editing the definition data.

The screen of FIG. 18 may be displayed when it is determined that the type of data (the subclass) of the instance included in the first data is not defined in the definition data. However, the screen of FIG. 18 can be displayed in different situations.

In above (FIG. 17 and FIG. 18), screens using GUIs were explained. However, the definition data may be edited by using command lines (CLIs). APIs (application programming interfaces) which enable the functions of FIG. 18 can be provided. Then, external programs can use the APIs to edit the definition data. The contents of screens and interfaces provided by the information processing device according to the embodiment are not limited.

The screen of FIG. 18 can be shown in any device. For example, the screen may be displayed on the display embedded in the information processing device 1. Also, the screen may be displayed in remote communication terminals including personal computers, smartphones and tablets.

In the information processing device and the information processing method according to the embodiment, the difference in the data of the physical world and the data of the cyber world is reflected in the definition of subclasses. Thereby, it is possible to obtain information on the source of data, nature of data and the relation between data, enabling the correct classification of data collected from numerous sensors, devices of different processes and various systems.

By classifying data collecting from a plurality of sources correctly, it is possible to obtain information on classes of data and their relations. Then, utilization of data across a plurality of systems becomes possible. By effective utilization of data originating from different processes, the automation of facilities including various infrastructures, factories and plants is accelerated. Also, the total optimization of operations and unification of operation become possible. The improvement of overall operation contributes to the reduction of various costs, improved safety and the higher qualities of manufactured goods.

Second Embodiment

Figure 19:
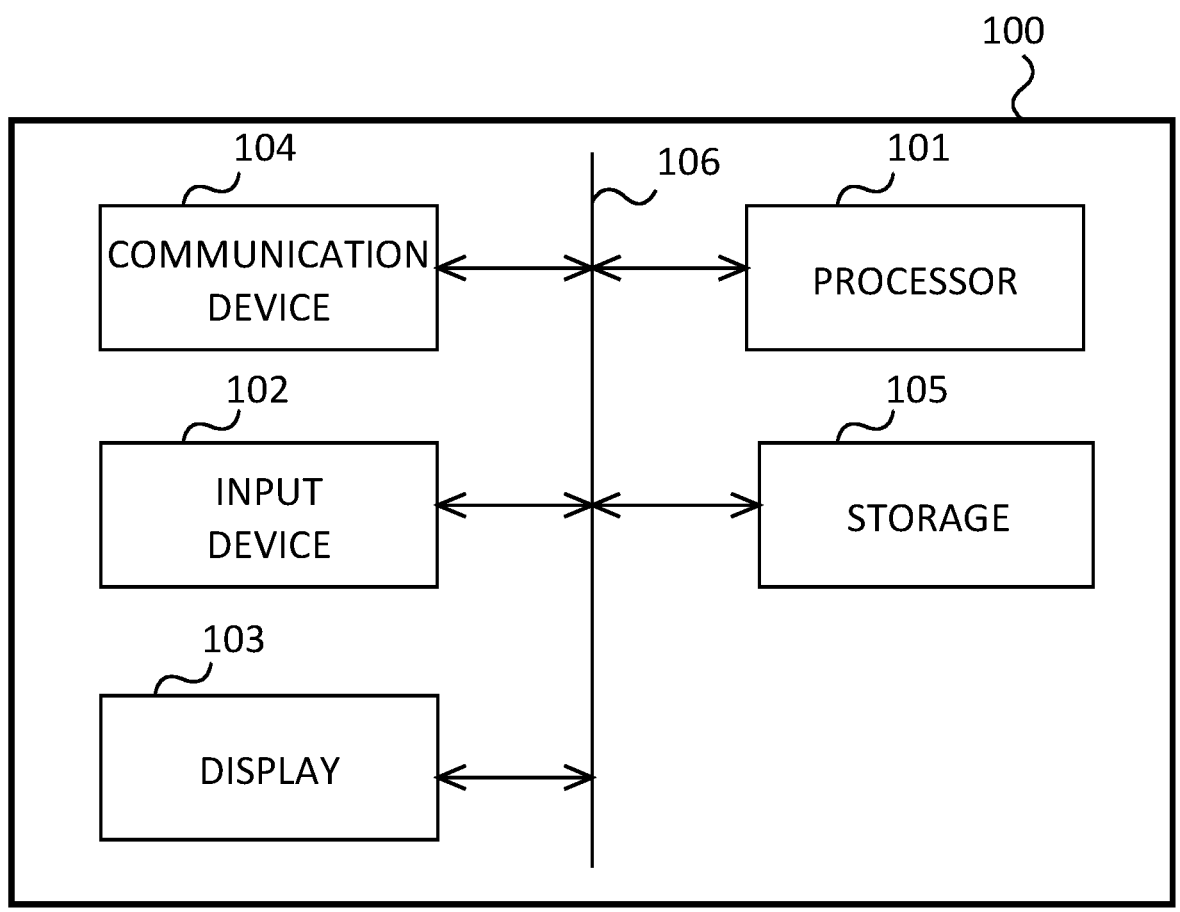
FIG. 19 is a block diagram presenting an example of an information processing device in accordance with a second embodiment.

FIG. 19 is a diagram showing hardware configuration of the information processing device. For example, the information processing device according to the first embodiment is configured by using a computer 100. Examples of the computer 100 include various information processing devices including servers, client devices, microprocessors of embedded devices, tablets, smartphones, feature phones and personal computers. The computer 100 may be implemented by VMs (virtual machines) or containers. The computer 100 in FIG. 19 includes a processor 101, an input device 102, a display 103, a communication device 104 and a storage 105. The processor 101, the input device 102, the display 103, the communication device 104 and the storage 105 are connected to each other by a bus 106.

The processor 101 is an electric circuit including the controller and arithmetic unit of the computer 100. It is possible to use general purpose processors, central processing units (CPUs), microprocessors, digital signal processors, controllers, microcontrollers, state-machines, ASICs, FPGAs, PLDs or a combination of the above as the processor 101.

The processor 101 executes arithmetic operations by using data or programs provided from devices connected via the bus 106 (for example, the input device 102, the communication device 104 and the storage 105). Also, the processor 101 transmits the calculated results and control signals to the devices connected via the bus 106 (for example, the display 103, the communication device 104 and the storage 105). Specifically, the processor 101 executes the OS (the operation system) of the computer 100 and programs. Also, the processor controls various devices which configure the computer 100.

By using the program, it is possible to make the computer 100 operate as the aforementioned information processing device 1. The program is stored in non-transitory storage medium which is readable by the computer. Examples of the storage medium include optical discs, magnetic discs, magnetic tapes, flash memories and semiconductor memory. However, the type of storage medium is not limited. When the processor 101 executes the program, the computer 100 operates as the information processing device 1.

The input device 102 is a device for entering information to the computer 100. Examples of the input device 102 include a keyboard, a mouse and a touch panel. However, the type of device is not limited. By using the input device 102, the user can enter the metamodel, hierarchical classification of classes, the codes of classes, the definition of schemas and the names for types of data.

The display 103 displays graphics and videos. Examples of the display 103 include a LCD (liquid crystal display), CRT (cathode ray tube) or an organic electroluminescence display. However, the type of displays used is not limited. The result of inferred and determined types of data and the editing screen of definition data can be presented on the display 103.

The communication device 104 enables the computer 100 to communicate with external devices via wireless or wired communication mediums. Examples of the communication device 104 include Network Interface Cards, communication modules, hubs and routers. However, the type of device is not limited. The computer 100 may collect measured data and configuration data from remote plants, factories and buildings via the communication device 104. Also, if the computer 100 (information processing device 1) are servers installed in data centers and machine rooms, the computer 100 may accept instructions transmitted from remote communication terminals and transmit contents to be displayed in remote communication terminals, via the communication device 104.

The storage 105 saves the operating system of the computer 100, the program, data necessary to execute the program and data generated by the program. The storage 105 includes the main storage device and the external storage device. Examples of the main storage device include RAM, DRAM and SRAM. However, the type of device used as the main storage device is not limited. Also, examples of the external storage device include HDD, optical discs, flash memory and magnetic tapes. However, the type of device used as the external storage is not limited. The log database 10, the schema database 11, the ontology database 12 and the metamodel database 13 can be configured on the storage 105. The above databases may be configured on external servers or external storage.

The computer 100 may include a plurality of processors 101, input devices 102, displays 103, communication devices 104 and storage 105. The computer 100 may be connected to peripheral devices such as printers or scanners.

The information processing device 1 may be configured with a single computer 100. The information processing device 1 may be configured with a plurality of computers which are connected to each other.

The program may be stored in the storage 105 of the computer 100. The program may be stored in the external storage. The program may be uploaded to the internet. By installing the program to the computer 100, the features of the information processing device 1 become executable.

The terms used in the embodiments should be interpreted broadly. For example, the term "processor" may include a general-purpose processor, a central processor (CPU), a microprocessor, a digital signal processor (DSP), a controller, a micro-controller, and a state machine. Depending on situations, the "processor" may indicate an application specific integrated circuit, a field programmable gate array (FPGA), a programmable logic circuit (PLD), and the like. The "processor" may indicate a combination of processing devices such as a plurality of microprocessors, a combination of a DSP and a microprocessor, and one or more microprocessors cooperating with a DSP core.

As another example, the term "memory" may include any electronic component capable of storing electronic information. The "memory" can indicate a random access memory (RAM), a read only memory (ROM), a programmable read only memory (PROM), an erasable programmable read only memory (EPROM), an electrically erasable PROM (EEPROM), a nonvolatile random access memory (NVRAM), a flash memory, and a magnetic or optical data storage. The data saved in the devices mentioned above can be read by a processor. If the processor performs reads, writes or both reads and writes to the memory, the memory can be considered to be communicating electrically with the processor. The memory can be integrated with the processor. In such cases as well, the memory can be considered as communicating electrically with the processor.

The term "storage device" or "storage" may include any device that can store data using magnetic technology, optical technology, or nonvolatile memory. For example, the storage can be a HDD, an optical disk, a SSD, or the like.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. An information processing method for classifying an instance comprising:
obtaining, by a processor from different sources in an electronic format via a network, different types of first data, the first data including an instance, the instance being actual data without metadata, and the different sources including a sensor system including a plurality of sensors installed in at least one facility, a control system which controls the at least one facility, and a management system which manages operation activities of the at least one facility;

inferring and determining, by the processor, a subclass among a plurality of subclasses the instance belongs to by referring to at least either definition data or log data stored in a storage device;

determining whether the instance included in the first data belongs to the subclass which is not defined in the definition data;

in response to determining that the instance included in the first data belongs to the subclass which is not defined in the definition data, displaying a graphical user interface for a user to edit the definition data;

receiving, via the graphical user interface, user's input that updates the definition data to include definition of the subclass;

storing the updated definition data in the storage device; and controlling, by the processor via electronic control signals provided to the control system, operations of the at least one facility by utilizing the instance included in the first data obtained across the plurality of sensors, the control system, and the management system of the at least one facility based on the determined subclass the instance belongs to, wherein:
the definition data defines the plurality of subclasses as subclasses of either physical world classes describing physical entities or cyber world classes describing concepts, the log data includes a set of the first data obtained in the past, and each of the first data in the log data including the instance the corresponding subclass is defined in the definition data.

2. The information processing method according to claim 1, further comprising the step of:
specifying a relation of the subclass the instance belongs to by referring to the relation between the subclasses defined in the definition data.

3. The information processing method according to claim 1, wherein
if the first data includes schema data defining the format of the instance, a first similarity between the format in the schema data and the formats of the instances belonging to the subclass in schema definition data is calculated, determining that the subclass of the instance included in the first data is the subclass corresponding to the format in the schema definition data with the highest first similarity with the format in the schema data.

4. The information processing method according to claim 3, wherein
if the greatest value of calculated first similarity is less than a threshold value, a message requiring a user to confirm the inferred and determined subclass for the instance included in the first data is notified.

5. The information processing method according to claim 1, wherein
if the first data includes first formal description data which is the identifier of the subclass, the first formal description data is compared to each of the second definition data which is the identifier of the subclass in the definition data and if a matching second definition data is found, it is inferred and determined that the subclass for the instance included in the first data is the subclass specified by the matching second definition data.

6. The information processing method according to claim 1, wherein a second similarity between a first instance which is the instance included in the first data and a second instance which is the instance in the log data is calculated and it is inferred and determined that the subclass of the second instance with the greatest second similarity is the subclass of the first instance.

7. The information processing method according to claim 1, wherein
if the first data does not include schema data defining the format of the instance but includes first formal description data which is the identifier of the subclass, the first formal description data is compared to each of the second definition data which is the identifier of the subclass in the definition data and if a matching second definition data is found, it is inferred and determined that the subclass for the instance included in the first data is the subclass specified by the matching second definition data.

8. The information processing method according to claim 1, wherein
if the first data does not include schema data defining the format of the instance and first formal description data which is the identifier of the subclass, a second similarity between a first instance which is the instance included in the first data and a second instance which is the instance in the log data is calculated and it is inferred and determined that the subclass of the second instance with the greatest second similarity is the subclass of the first instance.

9. The information processing method according to claim 1, further comprising the step of:
adding the definition of the subclass belonging to the instance and a schema defining a format of the instance to the definition data, if it is inferred and determined that the instance included in the first data belongs to the subclass which is not defined in the definition data.

10. The information processing method according to claim 9, wherein
if the subclass added to the definition data has an relation with another subclass defined in the definition data, information of the relation is also added to the definition data.

11. The information processing method according to claim 1, further comprising:
enabling a display to display the subclass the instance belongs to and a relation between the subclass the instance belongs to and another subclass among the plurality of subclasses.

12. The information processing method according to claim 1, further comprising:
controlling, by the processor, the operations of the at least one facility based on a relation between the subclass the instance belongs to and another subclass among the plurality of subclasses.

13. The information processing method according to claim 1, wherein the at least one facility includes at least one of infrastructures, factories, and plants.

14. The information processing method according to claim 1, wherein the operations of the at least one facility include at least one of launch, halt, control, manufacture, diagnosis, maintenance, shipments, packaging, analysis of data, configuration changes and changes of operation modes.

15. The information processing method according to claim 1, wherein the at least one facility includes a gas turbine facility, and the plurality of sensors include a temperature sensor and a flow sensor.

16. A non-transitory storage medium having a computer program stored therein configured to enable a computer to classify an instance, and to execute the processes of:
   obtaining, from different sources in an electronic format via a network, different types of first data, the first data including an instance, the instance being actual data without metadata, and the different sources including a sensor system including a plurality of sensors installed in at least one facility, a control system which manages operation activities of the at least one facility, and a management system which manages operation activities of the at least one facility;
   inferring and determining a subclass among a plurality of subclasses the instance belongs to by referring to at least either definition data or log data stored in a storage device;
   determining whether the instance included in the first data belongs to the subclass which is not defined in the definition data;
   in response to determining that the instance included in the first data belongs to the subclass which is not defined in the definition data, displaying a graphical user interface for a user to edit the definition data;
   receiving, via the graphical user interface, user's input that updates the definition data to include definition of the subclass;
   storing the updated definition data in the storage device; and
   controlling, via electronic control signals provided to the control system, operations of the at least one facility by utilizing the instance included in the first data obtained across the plurality of sensors, the control system, and the management system of the at least one facility based on the determined subclass the instance belongs to,
   wherein:
      the definition data defines the plurality of subclasses as subclasses of either physical world classes describing physical entities or cyber world classes describing concepts,
      the log data includes a set of the first data obtained in the past, and
      each of the first data in the log data including the instance belonging to the subclass is defined in the definition data.

17. The non-transitory storage medium according to claim 16, configured to enable the computer execute the process of:
   displaying the subclass the instance included in the first data is classified and a relation the subclass has in a display.

18. The non-transitory storage medium according to claim 16, wherein the at least one facility includes a gas turbine facility, and the plurality of sensors include a temperature sensor and a flow sensor.

19. An information processing device configured to classify an instance, comprising:
   a processing circuit configured to:
      obtain, from different sources in an electronic format via a network, different types of first data, the first data including an instance, the instance being actual data without metadata, and the different sources including a sensor system including a plurality of sensors installed in at least one facility, a control system which controls the at least one facility, and a management system which manages operation activities of the at least one facility; and
      infer and determine a subclass among a plurality of subclasses the instance belongs to by referring to at least either definition data or log data;
   a storage configured to save the definition data and the log data;
      determine whether the instance included in the first data belongs to the subclass which is not defined in the definition data;
      in response to determining that the instance included in the first data belongs to the subclass which is not defined in the definition data, display a graphical user interface for a user to edit the definition data;
      receive, via the graphical user interface, user's input that updates the definition data to include definition of the subclass;
      store the updated definition data in the storage device; and
      control, via electronic control signals provided to the control system, operations of the at least one facility by utilizing the instance included in the first data obtained across the plurality of sensors, the control system, and the management system of the at least one facility based on the determined subclass the instance belongs to,
   wherein:
      the definition data defines the plurality of subclasses as subclasses of either physical world classes describing physical entities or cyber world classes describing concepts,
      the log data includes a set of the first data obtained in the past, and
      each of the first data in the log data including the instance the corresponding subclass is defined in the definition data.

20. The information processing device according to claim 19, wherein
   the definition data is defining the relation between the subclasses and the processing circuit specifies the relation of the subclass the instance is classified by referring to the definition data.

21. The information processing device according to claim 19, wherein the at least one facility includes a gas turbine facility, and the plurality of sensors include a temperature sensor and a flow sensor.

* * * * *